(12) United States Patent
Hull et al.

(10) Patent No.: US 9,964,658 B2
(45) Date of Patent: May 8, 2018

(54) METHOD OF AUTONOMOUS POWER LINE DETECTION, AVOIDANCE, NAVIGATION, AND INSPECTION USING AERIAL CRAFTS

(71) Applicant: U.S. Army Research Laboratory ATTN: RDRL-LOC-I, Washington, DC (US)

(72) Inventors: David M. Hull, Adelphi, MD (US); Ross N. Adelman, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 102 days.

(21) Appl. No.: 14/875,927

(22) Filed: Oct. 6, 2015

(65) Prior Publication Data

US 2017/0097435 A1    Apr. 6, 2017

(51) Int. Cl.
*G01V 3/08*     (2006.01)
*B64C 13/18*    (2006.01)
(Continued)

(52) U.S. Cl.
CPC ............... *G01V 3/08* (2013.01); *B64C 13/10* (2013.01); *B64C 13/18* (2013.01); *G01C 23/00* (2013.01); *G01S 1/00* (2013.01); *G05D 1/0094* (2013.01); *G08G 5/0021* (2013.01); *G08G 5/0086* (2013.01)

(58) Field of Classification Search
CPC ...... G01V 3/08; G05D 1/0094; G08G 5/0021; G08G 5/0086
See application file for complete search history.

(56) References Cited

U.S. PATENT DOCUMENTS 3,778,761 A * 12/1973 Cribbins ................. B61L 25/02
                                                246/63 C
4,277,771 A *  7/1981 Chapin .................... G01V 3/08
                                                340/975
(Continued)

OTHER PUBLICATIONS

D. L. Lambdin, "A comparison of measurement techniques to determine electric fields and magnetic flux under EHV overhead power transmission lines", ORP/EAD US Environmental Protection Agency, Mar. 1978. Technical Note 78-1.
(Continued)

*Primary Examiner* — Thomas G Black
*Assistant Examiner* — Peter D Nolan
(74) *Attorney, Agent, or Firm* — Eric Brett Compton

(57) ABSTRACT

Embodiments of the present invention relate to power line detection, and more particularly, to methods and systems for autonomous power line detection, avoidance, navigation, and inspection. They may be implemented using aerial crafts, but do not have to. According to an embodiment, a method for detecting energized power lines in ambient space in the vicinity of an aerial craft is presented. The method includes measuring, with sensors located on the aerial craft, electric and magnetic fields in the space; and with a power line detection controller, detecting an energized power line in the space in the vicinity of the aerial craft using the sensor data; and determining the orientation of the detected energized power line in the space based on the electric and magnetic field measurements. Similar methods and systems are also presented.

23 Claims, 15 Drawing Sheets

(51) Int. Cl.
*B64C 13/10* (2006.01)
*G01S 1/00* (2006.01)
*G05D 1/00* (2006.01)
*G01C 23/00* (2006.01)
*G08G 5/00* (2006.01)

(56) References Cited

U.S. PATENT DOCUMENTS

| | | | | |
|---|---|---|---|---|
| 4,362,992 | A * | 12/1982 | Young | G01V 3/08 324/247 |
| 4,405,926 | A * | 9/1983 | Potter | G01V 3/165 342/455 |
| 5,252,912 | A * | 10/1993 | Merritt | G01R 29/085 324/72 |
| 5,859,597 | A * | 1/1999 | Cornelio | G01R 29/085 324/207.2 |
| 6,002,348 | A * | 12/1999 | Greene | B64C 27/006 340/945 |
| 7,286,912 | B2 * | 10/2007 | Rubin | G01C 23/00 324/457 |
| 7,440,858 | B2 * | 10/2008 | Simons | G01R 29/0892 702/66 |
| 7,512,258 | B2 * | 3/2009 | Yelton | G06T 7/155 340/945 |
| 7,543,780 | B1 * | 6/2009 | Marshall | B64C 39/024 244/110 G |
| 7,701,196 | B2 * | 4/2010 | Hull | G01R 31/42 324/67 |
| 7,839,321 | B2 * | 11/2010 | Huang | G01S 7/025 342/120 |
| 8,537,034 | B2 * | 9/2013 | Greene | G08G 5/0086 244/17.11 |
| 9,037,314 | B2 * | 5/2015 | Waite | G01C 21/20 701/1 |
| 9,162,753 | B1 * | 10/2015 | Panto | B64C 19/00 |
| 9,285,222 | B2 * | 3/2016 | Waite | G01C 21/20 |
| 9,551,561 | B2 * | 1/2017 | Kochanski | G01B 7/004 |
| 2002/0153485 | A1 * | 10/2002 | Nixon | G06K 9/4604 250/330 |
| 2006/0009887 | A1 * | 1/2006 | Rubin | G01C 23/00 701/9 |
| 2006/0235633 | A1 * | 10/2006 | Simons | G01R 29/0892 702/65 |
| 2012/0016538 | A1 * | 1/2012 | Waite | G01C 21/20 701/3 |
| 2013/0120164 | A1 * | 5/2013 | Greene | G08G 5/0086 340/946 |
| 2014/0139366 | A1 * | 5/2014 | Moses | G01S 13/9303 342/27 |
| 2014/0343878 | A1 | 11/2014 | Gudmundsson et al. | |
| 2015/0364047 | A1 * | 12/2015 | Block | B64D 13/00 701/301 |
| 2016/0229533 | A1 * | 8/2016 | van Cruyningen | B64C 31/024 |
| 2016/0232792 | A1 * | 8/2016 | van Cruyningen | B64C 39/024 |

OTHER PUBLICATIONS

R. G. Olsen and P. S. Wong, "Characteristics of low frequency electric and magnetic fields in the vicinity of electric power lines." IEEE Transactions on Power Delivery. Oct. 1992;7(4):2046•2055.

John David Jackson, "Classical Electrodynamics," (Third ed.) John Wiley & Sons, Inc. Chapter 6, Sections 6.7 & 8.5, 1999.

Robert J. Grasso et al., "OASYS Laser Radar Characterization of Natural and Manmade Terrestrial Features," Apr. 2000. [Available at: http://www.dtic.mil/cgi-bin/GetTRDoc?AD=ADA392392].

A. E. Emanuel, "Poynting vector and the physical meaning of nonactive powers," Instrumentation and Measurement Technology Conference, 2004. IMTC 04. Proceedings of the 21st IEEE (vol. 3), 1742-1747.

Zhengrong Li et al., "Knowledge-based power line detection for UAV surveillance and inspection systems," 23rd International Conference on Image and Vision Computing New Zealand, 2008 (IVCNZ 2008).

Vengalattore T. Nagaraj and Inderjit Chopra, "Safety Study of Wire Strike Devices Installed on Civil and Military Helicopters," DOT/FAA/AR-08/25, U.S. Department of Transportation Federal Aviation Administration, Sep. 2008. [Available at: http://www.tc.faa.gov/its/worldpac/techrpt/ar0825.pdf].

Stuart Lau, "A plan for reducing wire strike accidents," Professional Pilot, Nov. 2012, 84-87.

D. Hill and R. Adelman, An interactive 2-D power-line modeling and simulation tool. Proc. SPIE 8382. 2012;838204.

Powerline Detection System, Safe Flight Instrument Corporation, Copyright 2015. [Available at: http://www.safeflight.com/products/powerline-detection/ ; printed on Aug. 31, 2015].

"Amazon Prime Air," Amazon.com [Available at: http://www.amazon.com/b?node=8037720011; printed on Sep. 28, 2015].

"Camclone T21 Unmanned Autonomous Vehicle (UAV) fitted with CSIRO guidance system," CSIRO [Available at: http://www.scienceimage.csiro.au/image/10876; printed on Oct. 1, 2015].

Tim Struttmann and Ken Degg, "Risk and Reality Among Agricultural Pilots," Poster, Social & Scientific Systems, Inc. [Available at: https://www.s-3.com/images/documents/posters/struttman-risk-pilots.pdf; printed on Sep. 28, 2015].

Ross N. Adelman and David M. Hull, "US Army Research Laboratory Power-Line UAV Modeling and Simulation Software Tool: User Manual and Technical Report," U.S. Army Research Laboratory, Sep. 2015.

* cited by examiner

3-Phase, 115-kV, 2-MW-class Transmission Line

3-Phase, 230-kV, 8-MW-class Transmission Line $t_1: E_1, H_1$ $t_2: E_2, H_2$ $t_3: E_3, H_3$ $\vdots$ $t_n: E_n, H_n$ = location of 3-axis E-field /3-axis H-field sensors (405, 410)

craft's present location dx = distance traveled in time step craft's previous location $t_1$: $E_{port\_1}$, $H_{port\_1}$, $E_{star\_1}$, $H_{star\_1}$ $t_2$: $E_{port\_2}$, $H_{port\_2}$, $H_{star\_2}$, $H_{star\_2}$ $t_3$: $E_{port\_3}$, $H_{port\_3}$, $E_{star\_3}$, $H_{star\_3}$

⋮

$t_n$: $E_{port\_n}$, $H_{port\_n}$, $E_{star\_n}$, $H_{star\_n}$ dy = distance between sensor locations dx = distance traveled in time step

METHOD OF AUTONOMOUS POWER LINE DETECTION, AVOIDANCE, NAVIGATION, AND INSPECTION USING AERIAL CRAFTS

GOVERNMENT INTEREST

The invention described herein may be manufactured, used and licensed by or for the U.S. Government.

FIELD OF INVENTION

Embodiments of the present invention relate to power line detection, and more particularly, to methods and systems of autonomous power line detection, avoidance, navigation, and inspection.

BACKGROUND OF THE INVENTION

Electrical power lines pose a serious crash hazard to helicopters and other air-based vehicles, especially small aerial vehicles, such as unmanned aerial vehicles (UAVs). This is because power lines are so widespread, hard to see, and strung at roughly the same height above the ground that these aircraft fly. In fact, according to one report by the Federal Aviation Administration (FAA), power lines are the cause of roughly 5% of helicopter accidents. This statistic applies to both civilian and military cases. Another report found power-line collisions are responsible for 31% of accidents among agricultural aircraft. In many of these accidents, there were fatalities and injuries.

Current active systems for seeking to identify power lines, such as radar- or laser-based ones, are bulky, expensive, energy inefficient, and they generate unwanted signatures that could compromise their mission. Simple methods that use only passive electric- or magnetic-field sensors can easily fail when used near three-phase power lines. Moreover, these simple methods do not provide information on the orientation of the lines, the direction of power flow, or otherwise help UAVs avoid power lines.

BRIEF SUMMARY OF THE INVENTION

Embodiments of the present invention relate to power line detection, and more particularly, to methods of autonomous power line detection, avoidance, navigation, and inspection. They may be implemented using aerial crafts, but do not have to; other devices may be used.

According to an exemplary embodiment, a method for detecting energized power lines in ambient space in the vicinity of an aerial craft is first presented. The method includes measuring, with sensors located on the aerial craft, electric and magnetic fields in the space; and with a power line detection controller, detecting an energized power line in the space in the vicinity of the aerial craft using the sensor data; and determining the orientation of the detected energized power line in the space based on the electric and magnetic field measurements.

In detecting an energized power line in the space in the vicinity of the aerial craft using the sensor data, the above method can use: the electric field measurement; the magnetic field measurement; a derivative of the electric field measurement; and/or a derivative of the magnetic field measurement. In some embodiments, improved detecting may be achieved using both the electric and magnetic field measurements; and/or derivatives of both the electric and magnetic field measurements. By using measurements of (or derivatives of) both the electric and magnetic fields, false positives can be significantly reduced, if not eliminated. Additionally or alternatively, the detecting can be achieved using a Poynting vector; and/or a derivative of the Poynting vector. The Poynting vector is the cross product of the electric field and magnetic field and is parallel or nearly parallel to the lines.

Normalized values of the sensor data may further be calculated, for some applications, as normalized values can provide consistent detection thresholds vs. distance, regardless of the magnitude of the voltage/current values of the power lines.

A simple comparing step can be used for identifying power lines based on the above data. These values can be compared to one or more predetermined threshold values for the particular sensor data. For example, if the electric field measurement, the magnetic field measurement, the derivative of the electric field measurement, the derivative of the magnetic field measurement, the Poynting vector, and/or the derivative of the Poynting vector is/are greater than a corresponding predetermined threshold value for that value, then an energized power line may be identified. Furthermore, by using various combinations of these values, false positives can be reduced, if not eliminated.

The energized power line is generally parallel to the Poynting vector. In general, the positive value of Poynting vector points downstream in the direction of power flow (e.g., in the direction of a load) whereas the negative value of the Poynting vector points upstream of the direction of the power flow (e.g., in the direction of the power generating source). Thus, to determine the orientation of any detected power line, the method calculates the Poynting vector using the measured electric and magnetic fields to determine a directional reference vector for the energized power line. For more accurate calculations, the Poynting vector may be time-averaged. In some implementations, the Poynting vector may be calculated every power cycle of the electricity expected to be carried by the power line.

The locations of the aerial craft and any detected energized power line may be continuously tracked such that they can be avoided in addition to optionally being further used for navigation and/or inspection purposes. For human piloted aerial crafts, the method may further alert the pilot to the presence of any detected energized power line in the vicinity of the aerial craft. With this knowledge, the pilot can execute maneuvers to avoid the detected power lines. On the other hand, for autonomously controlled aerial crafts, the method may further determine and/or execute maneuvers, on its own, to automatically control the aerial craft to avoid colliding with the energized power line. This may be achieved by interfacing with the craft's dynamic flight controller. In further embodiments, the method includes using the aerial craft to navigate and inspect power lines. This include controlling the aerial craft to follow along in a direction substantially parallel to that of the Poynting vector and thus the detected energized power.

According to other embodiments, a system for detecting energized power lines in ambient space in the vicinity of an aerial craft is also presented. The system, is configured, for executing the above method. It includes electric field and magnetic field sensors located on the aerial craft configured to measure the electric and magnetic fields in the space; and a power line detection controller configured to: detect an energized power line in the space in the vicinity of the aerial craft using the sensor data; and determine the orientation of the detected energized power line in the space based on the electric and magnetic field measurements.

In the system, the electric field sensor and magnetic field sensor may each comprise a single three-axis sensor or three single-axis sensors aligned orthogonally. Preferably, the electric field sensor and magnetic field sensor are located at the same position on the aerial craft. Also, there may be pairs of electric field and magnetic field sensors which can be used measure spatial derivatives of these fields.

In piloted aerial craft, the system may include an instrument panel having audio means, visual means, or both, for alerting a pilot to a detected energized power line. And, in an autonomously controlled aerial craft, the system may include a dynamic flight controller, wherein the power line detection controller is further configured to determining maneuvers for the aerial craft to avoid the detected energized power lines which are provided to the dynamic flight controller. The power line detection controller is further configured to determine maneuvers for the aerial craft to inspect the detected energized power lines. While it is generally envisioned that the power line detection controller is located on the aerial craft, it could be remotely located, for instance, if weigh of the craft is a concern.

According to additional embodiments, an aerial craft is configured to detect energized power lines in ambient space. The craft here includes electric field and magnetic field sensors configured to measure the electric and magnetic fields in the space in the vicinity of the aerial craft; and a power line detection controller configured to: detect an energized power line in the space in the vicinity of the aerial craft using the sensor data.

The aforementioned embodiments have involved aerial crafts. However, embodiments may be used with various devices other than aerial crafts. Thus, according to even further embodiments, any device can be configured to detect energized power lines in a similar manner as previously mentioned. Such a device includes electric field and magnetic field sensors configured to measure the electric and magnetic fields in the space; and a controller configured to: detect an energized power line in the space using the sensor data. The device could be configured to be hand-held or incorporated into a helmet or vehicle, for example.

These and other embodiments are explained in further detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIG. 5 shows the overall processing method for the controller. FIG. 5(A) shows power line detection processing in more detail. FIG. 5(B) shows power line avoidance processing in more detail. FIG. 5(C) shows navigation and inspection processing in more detail.

FIGS. 6(A) and 6(B) show the magnitudes of the fields for a 3-phase, 115-kV, 2-MW-class transmission line. FIGS. 7(A) and 7(B) show the magnitudes of the fields for a 3-phase, 230-kV, 8-MW-class transmission line. FIGS. 6(C) and 6(D) shows the spatial derivatives of the magnitudes of the fields for the 3-phase, 115-kV, 2-MW-class transmission line. FIGS. 7(C) and 7(D) shows the spatial derivatives of the magnitudes of the fields for the 3-phase, 115-kV, 2-MW-class transmission line, 3-Phase, 230-kV, 8-MW-class transmission line.

FIG. 8(A) shows a single sensor pair used for measuring E- and H-fields. FIG. 8(B) shows how this same single sensor pair can be used for calculating spatial derivative values of E and H in the x-direction. FIG. 8(C) shows two sensor pairs used for measuring E and H. FIG. 8(D) shows how the two sensor pairs can be used for calculating spatial derivative values of E and H in both the x- and y-directions.

DETAILED DESCRIPTION OF THE INVENTION

Figure 1A:
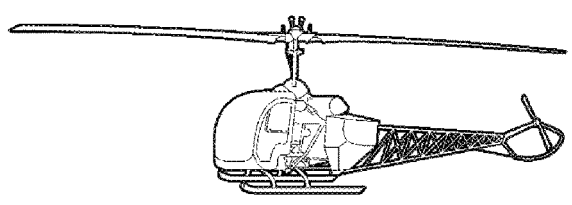
FIG. 1(A) through FIG. 1(D) are photographs that show some exemplary aerial crafts presently known or commercially used which could be benefited by embodiments of the present invention.

The present invention provides a lightweight, low-power, passive system to detect energized power lines. Not only can the invention be used to detect the power lines, but it also can be used to avoid the power lines, and track, navigate or inspect the power lines. A large number of applications are also discussed.

In some embodiments, the invention uses aerial crafts. Thus, these embodiments provide an efficient methodology for detecting energized power lines and which may be used for autonomously controlling an aerial craft in such a manner as to avoid colliding with the power line, and/or to allow the craft to follow the power line. In general, during the detection phase, the method monitors the absolute strengths of the electric and magnetic fields (generated by the power lines), the percent changes per distance flown in the direction of flight of these quantities, and, optionally, the wing-to-wing variations of them. When any one of these quantities goes above a specified threshold, the method "detects" the lines. During the avoidance phase, the method can compute the time-averaged Poynting vector, which is parallel or nearly parallel to the lines and points downstream in the direction of power flow. The aerial vehicle can use this information to steer away from the lines to avoid crashing into them. Once the power lines have been avoided, the Poynting vector can also be used as a navigational aid. This is, the aerial craft can follow the power lines "upstream" toward the source (e.g., generator or substation) or "downstream" away from the source and/or toward the load.

Aerial crafts include any vehicle capable of controlled airborne travel. These may include, for example, various fixed wing crafts, gliders, rotorcrafts, such as helicopters and autogyros, and lighter-than-air-crafts (e.g., balloons, dirigibles, blimps, etc.). These may be used for a variety of uses: inspection, surveillance and reconnaissance, search and rescue, transportation, agricultural, to name a few. The modes of flight and motion vary depending on the type of vehicle. Fixed wing craft may use propeller or jet thrust for propulsion for lift and rotorcrafts may use one or more rotors for providing lift and thrust, for example. These may be unmanned aerial vehicles (UAVs) or unpiloted aerial vehicles, which are colloquially or more commonly referred to as "drones," used for various military, civilian and commercial applications. Gliders may be capable of providing lift and steering as well. The drone or aerial craft might also be a toy or amusement device. The aerial crafts may be autonomous and/or remotely controlled. Flight coordinate/directional information may be stored in an on-board memory of the flight controller which controls the operation of the craft. The aerial craft may use gyroscopic, GPS (Global Positioning System) data and/or line of site information to maintain of the desired intended flight path. The aerial crafts may also include manned or piloted craft. Power lines still pose a threat for low flying manned craft and during take-off and landing, especially at night and poor visibility situations, such as cloudy or hazy conditions. Thus, detection of power lines may be beneficial, even for human pilots in these situations.

Figure 1B:
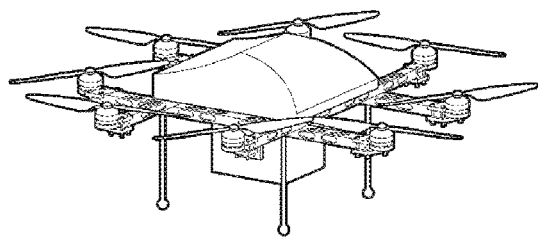
Figure 1C:
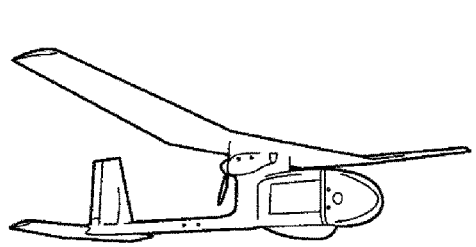
Figure 1D:
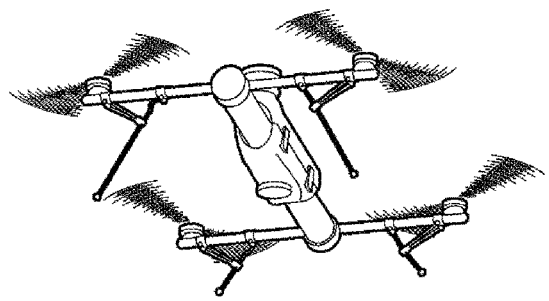

FIG. 1(A) through FIG. 1(D) are photographs that show some exemplary aerial crafts presently known or commercially used. FIG. 1(A) shows a single-piloted crop dusting helicopter that has crashed. FIG. 1(B) shows the Amazon.com Prime Air concept drone, which the company announced on Dec. 1, 2013 and proposes to use for commercially delivering goods and products to consumers. FIG. 1(C) shows the AeroVironment Raven, a fixed-wing UAV used for surveillance. FIG. 1(D) shows the AeroVironment Shrike VTOL which is a well-known quadcopter used for inspection purposes. These types of aerial crafts and many others could be benefited by the present invention.

Figure 2:
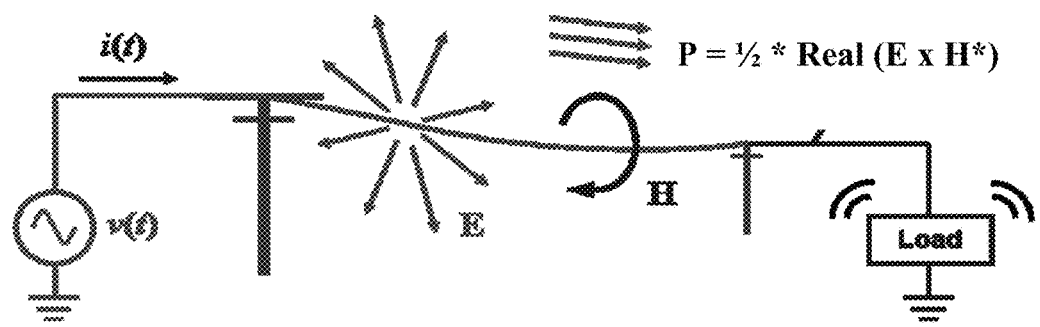
FIG. 2 depicts a schematic of typical power lines that distribute electricity.

FIG. 2 depicts a schematic of typical power lines which distribute electrical power. Electricity is produced at a power plant(s) and distributed to loads, such as homes, industries, businesses, etc. The power lines are suspended above the ground, e.g., 5-30 meters, and are held up or otherwise suspended by various towers or telephone poles at regularly spaced-apart intervals. The power lines may span many 100s-1,000s of km. High voltage power typically uses alternating current (AC), especially, for transferring power over long distances (although direct current (DC) carrying power lines may also be present). The voltages and current on power lines gives rise to quasi-static electric E and magnetic H fields, respectively.

More particularly, the AC voltages v(t) on the power lines give rise to an electric field E, and the AC currents i(t) running through the power lines give rise to a magnetic field H. The electric field E emanates outwardly or radially from the power line. On the other hand, the magnetic field H encircles the power line.

These fields are quasi-static. In many electromagnetic systems, the electric field and magnetic field are interrelated. But at power-line frequencies (typically 50 or 60 Hz), the coupling terms are insignificant relative to the primary fields. Both the electric field E and magnetic field H can be measured at any point in space around the power lines using appropriate electric- and magnetic-field sensors, as later discussed.

The strength of the electric and magnetic fields depends on the type of power lines. For example, the electric field around a high-voltage transmission line is much stronger than around a low-voltage distribution line. E-field tends toward the ground; at far distance from the power lines they are substantially vertical to the ground. Likewise, the line currents are generally much higher during peak load (e.g., during a hot summer afternoon, rather than at night). At large distances from 3-phase power lines, both the electric field E and magnetic field H are inversely proportional to distance r squared from the power lines, i.e., $E \propto 1/r^2$; $H \propto 1/r^2$. Closer to the lines, and particularly within a few line-line spacings, the fields are more complex.

The presence of both the electric field E and magnetic field H gives rise to the Poynting vector P, which can be used to determine the orientation of the power lines. At high frequencies, and at distances that are large compared to the electromagnetic wavelength (i.e., the far zone), coupled electromagnetic waves propagate in space, the Poynting vector P represents the directional energy flux density (i.e., the rate of energy transfer per unit area) of an electromagnetic field. The Poynting vector P is mathematically defined as the cross product of the electric and magnetic fields. See, e.g., John David Jackson, "Classical Electrodynamics," (Third ed.) John Wiley & Sons, Inc. Chapter 6, Section 6.7, 1999, herein incorporated by reference.

In SI units, the Poynting vector P may be reported in units of watts per square meter ($W \cdot m^{-2}$). Computation of this vector requires measurement data for both the electric E and magnetic H fields. At low frequencies, including 50/60-Hz quasi-static power-line fields, the Poynting vector can still be computed in the near zone, but the E and H fields are not coupled, and so the Poynting vector does not have the same physical meaning as it does in the far zone.

Figure 3:
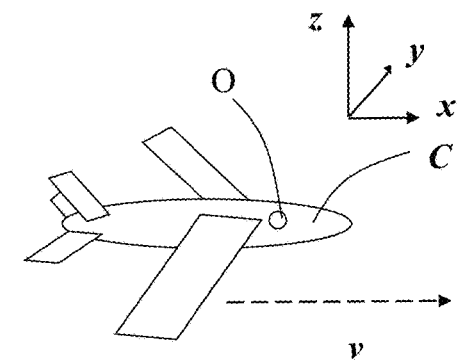
FIG. 3 shows one exemplary local coordinate system of the aerial craft in ambient space.
Figure 3:
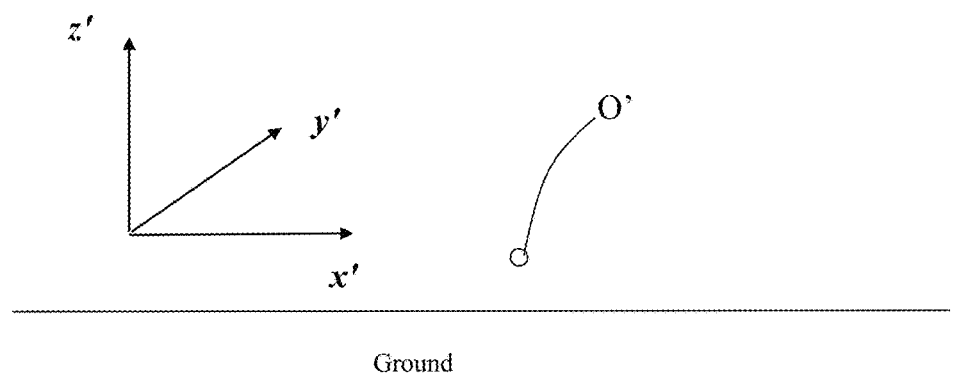

FIG. 3 shows one exemplary local coordinate system of the aerial craft C in ambient space. Here, the local coordinate system may be defined as follows: the x axis points forward, in the direction of flight; the y axis points to the left, towards the port side of the aerial craft; and the z axis points straight up, towards the sky. A point of origin O may be assumed with respect to the aerial craft C. It might be the center of mass/gravity, location of nose, location of E- or H-field sensors, or any point thereof, for instance. Of course, other local coordinate systems might alternatively be used (e.g., elevation and azimuth coordinates).

A global coordinate system may be used with respect to the earth with a point of original O' on the ground having global coordinate axes x', y' and z'. These may be provided by a GPS system, in terms of longitude, latitude, and altitude, for instance. The dimensions of the aerial craft C may be known a priori, and stored in memory as coordinates. Using local coordinate system may be simpler in terms of memory and/or processing resources and requirements, in some instances, as only space in the vicinity of the aerial craft may need to be considered. But, various assumptions of air space and boundaries may be used to make global tracking easier to implement. Global coordinates may be converted into local coordinates and vice versa using known coordinate transform algorithms.

The location of any power lines in the vicinity of the aerial craft C is generally unknown. But, if some a priori knowledge of the layout of the power lines is available, then absolute location information can be provided; this could augment location information from an inertial measurement unit (IMU) or inertial navigation unit (INU). This could be especially useful in GPS-denied areas.

Figure 4:
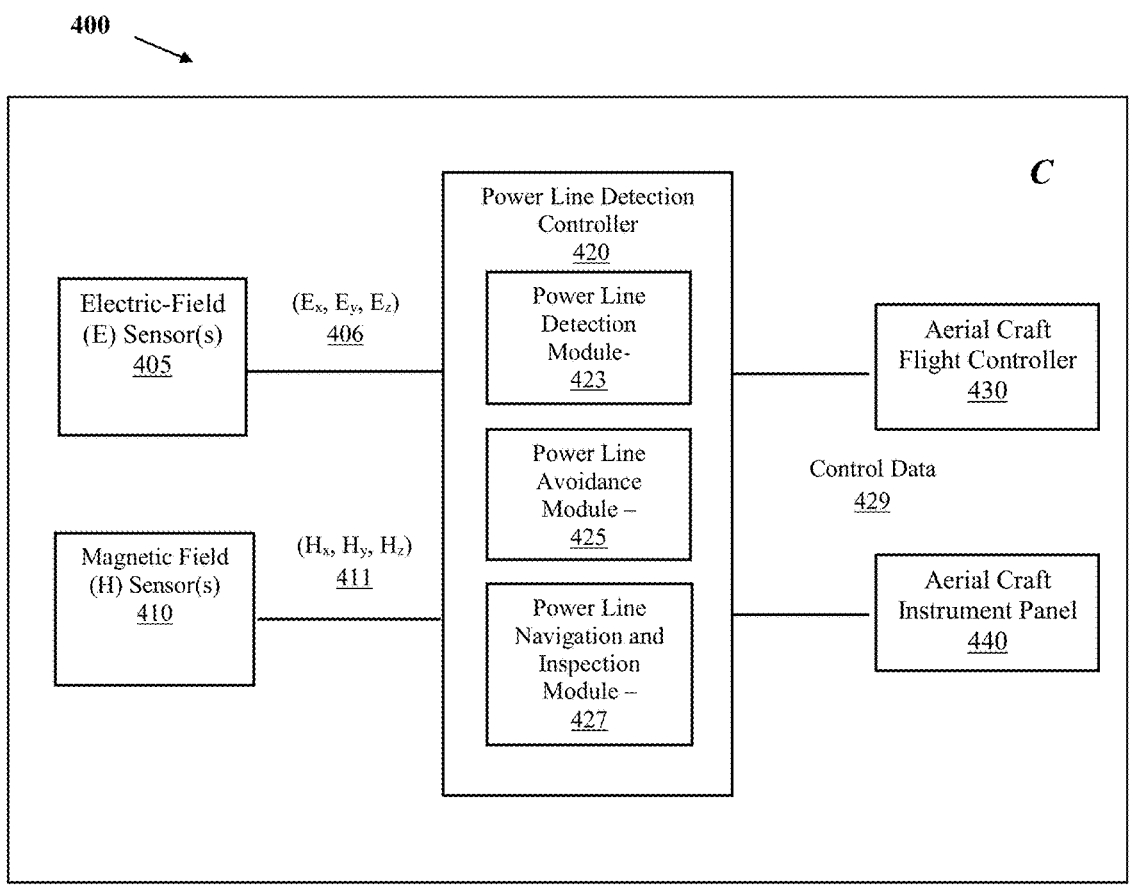
FIG. 4 shows an exemplary schematic of a system architecture according to embodiments of the present invention.

FIG. 4 shows an exemplary schematic of a system architecture 400 according to embodiments of the present invention. The aerial craft is illustratively depicted as element C. For measurement of the electric E and magnetic H fields, the aerial vehicle is equipped with sensors 405, 410 configured to measure the electric field and the magnetic field, respectively. The outputs 406, 411 from the sensors 405, 410 are fed into the power line detection controller 420.

The controller 420 may be embodied as a plurality of electronic modules. The electronic modules may be implemented as hardware, software or a combination thereof. The modules may be implemented with a computer of computing device having one or more processors (or micro-processors) as known in the art that are specifically configured to execute coding necessary to implement embodiments of the present invention. Processor-executable instructions can be stored in a memory device and execute by the processors when needed. In some implementations, software code (instructions), firmware, or the like, may be stored on a computer or machine-readable storage media having computer or machine-executable instructions executable by the processor(s). The processor(s) may be a programmable processor, such as, for example, a field-programmable gate array (FGPA) or an application-specific integrated circuit (ASIC) processor. The methodology disclosed herein may be implemented and executed by an application may be created using any number of programming routines. Of course, any number of hardware and/or software implementations, programming languages, and operating platforms may be used without departing from the spirit or scope of the invention. As such, the description or recitation of any specific hardware implementation, programming language, and operating platform herein is exemplary only and should not be viewed as limiting.

In general, the power line detection controller 420 includes a power line detection module 423, a power line avoidance module 425, and a power line navigation module 427. Other modules are also possible. The controller 420 is operable connected to the flight controller 430 of the aerial craft. This might be a direct connection or could be wireless, for instance. In some embodiments, the controller 420 might be located remotely from the aerial craft (e.g., at a ground station) with the sensor data and controller output wirelessly transmitted to/from the aerial; by removing the processing means from the aerial craft, the aerial craft may be lightened.

The overall processing methodology executed by the controller 420 is further illustrated in FIG. 5 and described below. The power line detection module 423 executes processing specifically configured to detect energized power lines in the ambient space of the aerial craft using electric field and magnetic field data. The power line detection module 423 uses E-field and H-field sensor data 406, 411 to determine whether the aerial craft is "close" to energized power lines. When the magnitude of the electric field (particularly in the direction of flight), the magnetic field (particularly in the vertical direction perpendicular to the flight vector), and/or the Poynting vector increases above predetermined threshold values, and/or when any of these vectors are increasing at a rate above threshold values, then it can be determined that the vehicle is approaching "too close" to a power line. The basis processing methodology of power line detection module 423 is further illustrated in FIG. 5(A) and described below.

The power line avoidance module 425 executes processing specifically configured to avoid detected energized power lines. Once power lines are detected, an avoidance operation may then be determined, and later executed. For example, it may be possible to choose to maneuver the vehicle around or away the obstacle. Thus, power line avoidance module 425 determines appropriate maneuvers and associated control data, such as steering the vehicle to avoid detected power lines. It could fly above (or perhaps below, if there is sufficient space), or simply away from it to avoid detected power lines. The specific processing methodology is further illustrated in FIG. 5(B) and described below.

The power line navigation module 427 executes processing specifically configured to navigate and inspect detected energized power lines. For instance, the power line navigation module 427 determines appropriate associated control data, such as steering the vehicle to follow the line "downstream" (i.e., toward the load), or "upstream" (i.e., toward the power generating source). The specific processing methodology is further illustrated in FIG. 5(C) and described below.

Sensor data 406, 411 may be input to an analog-to-digital (A/D) converter, which digitizes and samples the signals at some specified sampling frequency, in some instances. In the United States and most of North America, the operating frequency of power lines is typically 60 Hz. In other parts of the world, though, the frequency may be different. (For instance, in much of Europe, AC power frequency is 50 Hz). In order to resolve these frequencies from the digitized signal, the sampling frequency should be at least twice these frequencies according to the Nyquist sampling theorem. However, for better accuracy and precision, the sampling rate should be higher, e.g., at least 1-2 kHz. The resulting co-registered electric and magnetic fields samples from the A/D convertor are fed into a controller 420 for further processing. Once the E and H fields are measured, pre-processed by the A/D convertor, the rest of the methodology performed by the controller 420, is largely data-processing, which may be hardware and/or software-based.

In the controller 420, the sensor data 406, 411 samples can be divided up into data chunks called frames by a frame dividing register, such as a digital register circuit, where N is the number of samples per frame. Optionally, frames may overlap. A fast Fourier transform (FFT) is applied to each frame to transform from the time domain to the frequency domain as processing in the latter domain is computational easier. For instance, one might, for example, sample at 1024 samples/s (sps), and perform an FFT on one-second frames, which may be sufficient for most applications. The complex coefficient associated with the operating frequency (e.g., 50 or 60 Hz) of the power lines is extracted for each of sensors 405, 410. In a one-second frame, the energy at 60 Hz is contained in the 60th coefficient. Alternately, analog and/or digital filters and known time-domain techniques can be used to extract the coefficients. For example, a simple bandpass filter centered around 60 Hz can be used to focus on signals at that power-line frequency, and the magnitude and phase information can be estimated using simple comparators during each power cycle.

Let $E_x$, $E_y$, $E_z$, $H_x$, $H_y$, and $H_z$ be these complex coefficients, and construct two three-dimensional vectors: $E=(E_x, E_y, E_z)$ and $H=(H_x, H_y, H_z)$. At this point, for every frame (which occurs at most every N samples depending on how much frame overlap there is), the computing device calculates the complex electric and magnetic field vectors, E and H, as measured by the vehicle.

Figure 5:
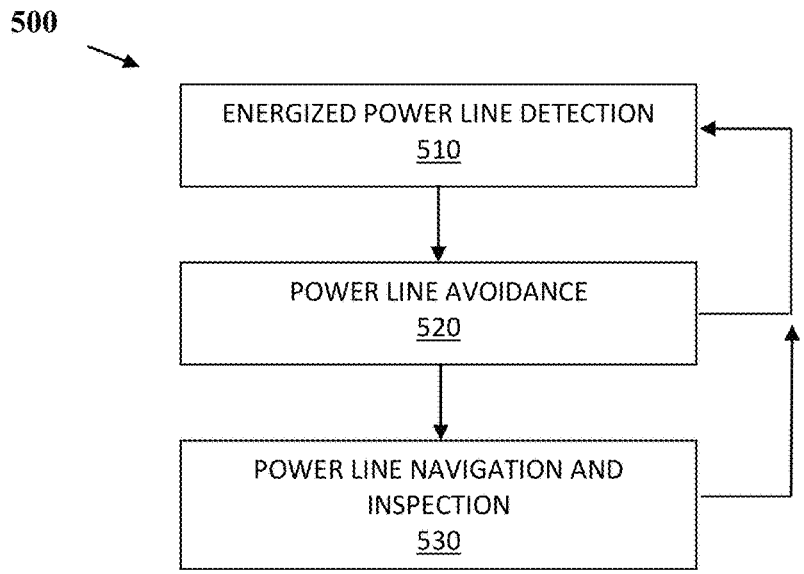
FIGS. 5 and 5(A)-5(C) show processing methodologies executed by the power line detection controller according to embodiments of the present invention.
Figure 5A:
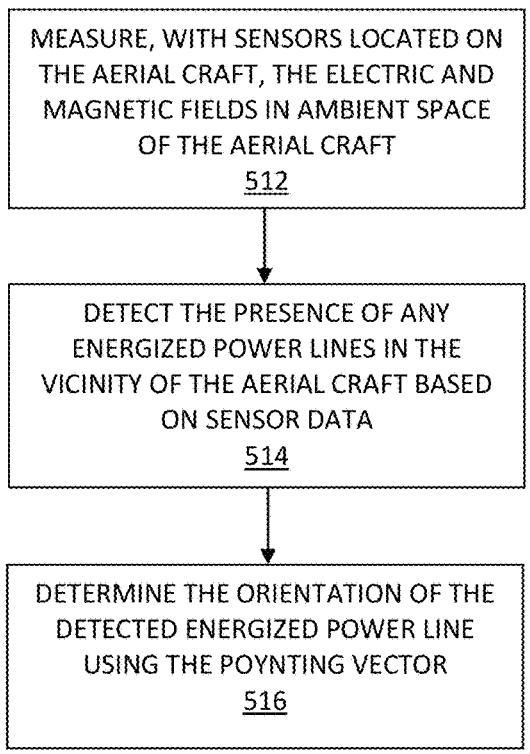
Figure 5B:
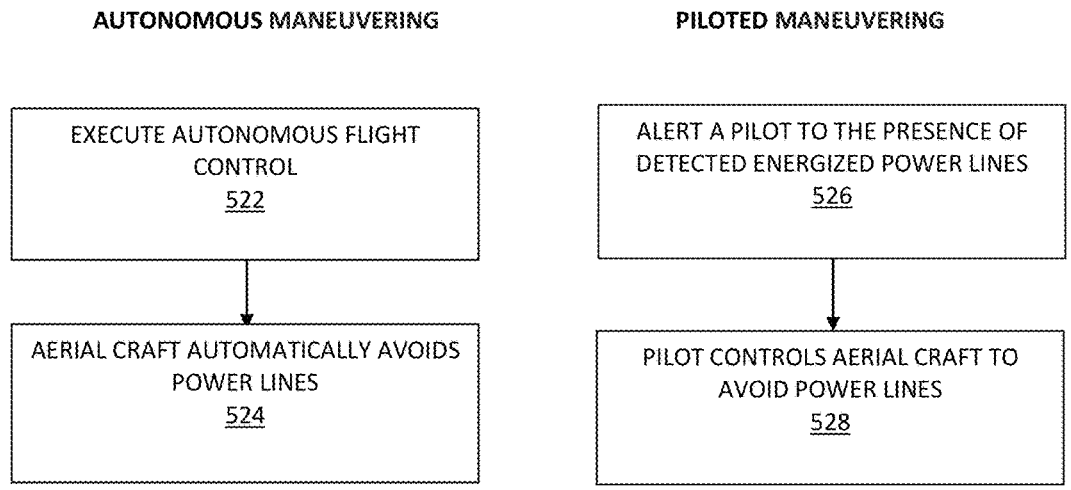
Figure 5C:
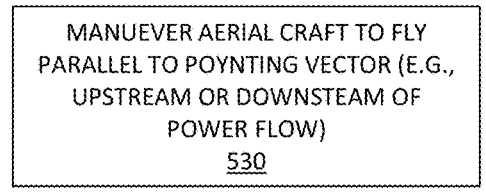

FIGS. 5 and 5(A)-5(C) show processing methodologies executed by the power line detection controller 420 according to embodiments of the present invention. FIG. 5 shows the overall processing method 500 for controller 420, and process steps 510, 520 and 530 executed by the power line detection module 423, the power line avoidance module 425, and the power line navigation module 427, respectively. In step 510, the power line detection module 423 detects any energized power lines are in ambient space in the vicinity of the aerial craft. FIG. 5(A) further shows this processing in more detail. Next, in step 520, the power line avoidance module 425 determines maneuvers for the aerial craft to avoid any detected power lines. FIG. 5(B) further shows this processing in more detail. And then, in step 530, the power line navigation module 427 determines navigation and inspection maneuvers of any detected power lines. FIG. 5(C) further shows this processing in more detail. For some applications, only step 510 or only steps 510 and 520 may be performed.

Returning to FIG. 4, control data 429 is output from the power line detection controller 420. The type of data 429 may vary significantly depending on the aerial craft and whether or not it is autonomously controlled or piloted. The output of the power line detection controller 420 may be utilized by an aerial craft flight controller 430 and an aerial craft instrument panel 440.

The aerial craft flight controller 430 is configured for autonomous control of the aerial craft. This may also be known as "auto-pilot" in the art. Such systems are well-known and specific to the particular aerial craft. This may be considered a so-called "black-box" controller. More particularly, the aerial craft flight controller 430 executes flight control of the aerial craft based on various parameters, such as navigation means, flight parameters and dynamics for that vehicle. (For instance, the flight dynamics and parameters of a helicopter are different from a twin-prop airplane). Generally speaking, the aerial craft flight controller 430 is designed to maintain the aerial craft on a predetermined flight path or trajectory. Navigation may utilize GPS data, compass data, gyroscopic data, line of sight data (e.g., from a camera, radar, lidar, etc.), or any combination thereof, for instance. If the craft deviates from its intended flight path/trajectory, the aerial craft flight controller 430 executes specific maneuvers to return, and hopefully keep, the aerial craft on the predetermined path. This is an on-going process, and may be very complex.

As discussed above, power lines present a collision hazard to aerial crafts. Thus, in accordance with embodiments of the present invention, control data 429 may be continuously provided to the aerial craft flight controller 430, so as to advantageously provide the controller 430 with an understanding or knowledge detected power lines in the ambient space of the aerial craft. More, the control data 429 may further instruct the controller 430 as to how to avoid or navigate the detected power lines. This may take many forms depending of the sophistication of the aerial craft flight controller 430.

For some flight controllers 430, the position and/or orientation of any detected power lines could be input as control data 429 indicating potential obstacles, and the controller 430 can automatically avoid these them. However, for more simplistic flight controllers 430, without such capability, the control data 429 may provide new or deviated flight information so that the aerial craft avoids the detected power lines. The control data might temporarily override the present flight path control (executed by controller 430) and provide new control data for maneuvering around or away from the obstacles and once removed, the return back to the flight path control executed by the flight controller 430. Alternatively, the control data 429 might provide flight data to the flight controller 430 which causes it to deviate from its present flight path and avoids the obstacle.

The aerial craft instrument panel 440 is used by a (human) pilot to control the aerial craft. It is typically found in the cockpit. If the aerial craft is not piloted, such as the case of a UAV or drone, an instrumental panel is probably not present. The instrument panel 440 includes all the necessary controls, electronic (avionics), gauges, and other means for the pilot to control the craft, which will vary from vehicle to vehicle. Common instruments and gauges, which are found in most aerial crafts, include an altimeter, airspeed indicator, vertical speed indicator, compass, heading indicator, turn indicator, for example. Additionally, it may be common for the panel to include a fuel gauge, radio or other communication means, steering and landing controls, lighting controls, temperature indicators, to name a few.

Knowledge of any power lines in the ambient space of the aerial craft may be very important to the pilot which present a collision hazard to aerial crafts. As discussed above, power lines still pose a threat for low flying manned craft and during take-off and landing, especially at night and poor visibility situations, such as cloudy or hazy conditions. Thus, in accordance with embodiments of the present invention, the instrument panel 440 may be configured for alerting the pilot to the presence of any power lines detected by the power line detection controller 420. The instrument panel 440 may include audio means, visual means or both for alerting the pilot. For instance, a speaker or siren may be activated by control data 429 to produce sounds; thus could be a simple alert message, such as "Power lines have been detected in the vicinity. Fly with caution." or a beep or specific sound which the pilot associated with the same. Further information might also be provided to the pilot, such as the distance and/or location to the detect power lines from the craft's current position. One message might be "Power lines have been detected approximately 1500 m ahead on the current flight path. Fly with caution." Alternatively or additionally, the instrument panel 440 may include visual means for doing the same. This could include an alert warning lamp/light or other indicia being activated. A light/lamp light could be turned cony or blinked or flashed 'on'/'off' to get the pilot's attention and alert him or her to the hazard. The intensity of the light or sound could relate to distance to the power line.

Figure 10:
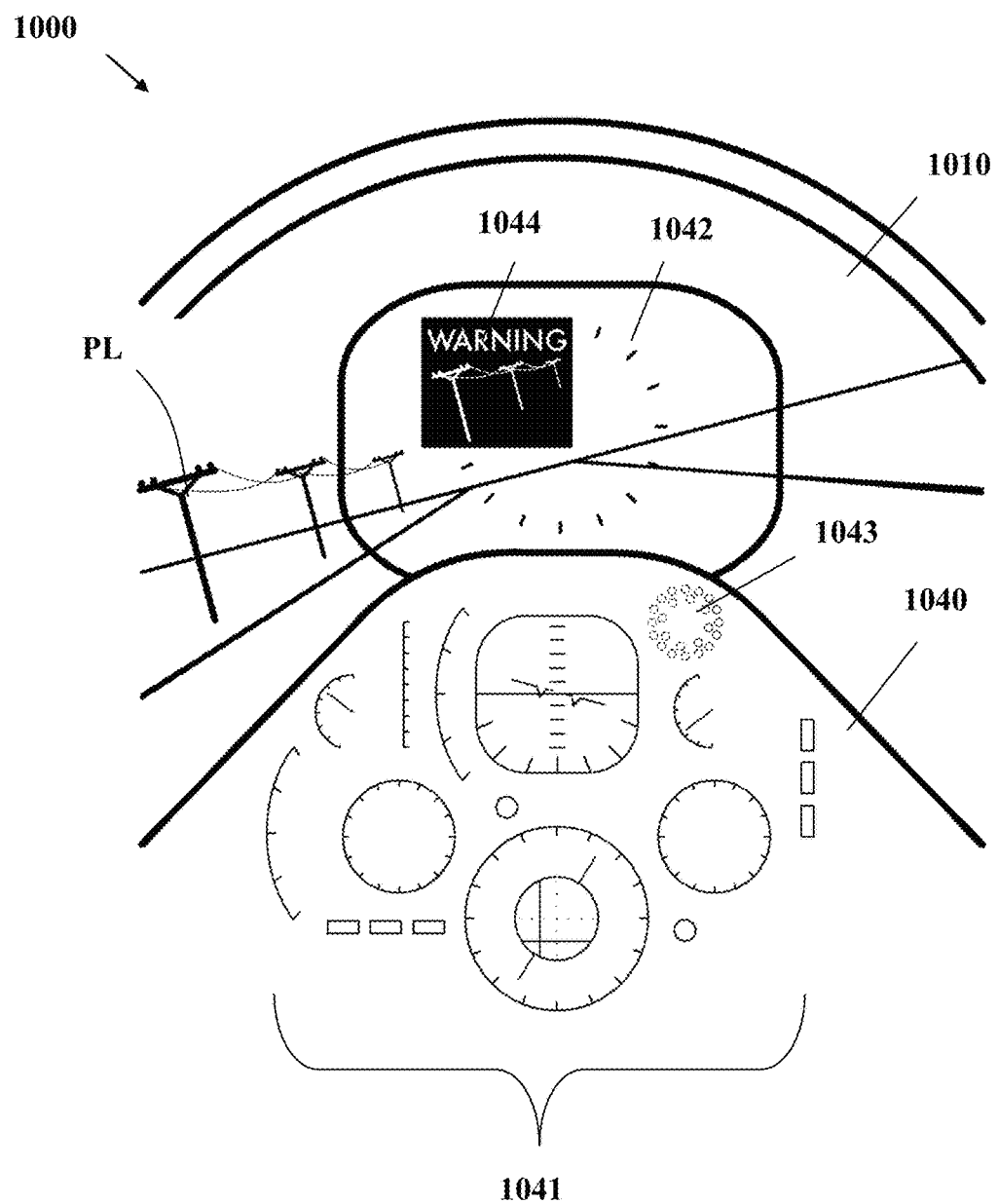
FIG. 10 shows an exemplary cockpit of a piloted aerial craft having an instrument panel according to an embodiment.

Moreover, in additional to alerting the pilot to the presence of any detected power lines, the instrument panel 440 may be configured to display the location and/or orientation of the power lines to the pilot. This could be on a "heads-up-display" or perhaps another designated display. One exemplary instrument panel according to an embodiment of the invention is illustrated in FIG. 10, further discussed below.

FIG. 5(A) shows the processing for detection any energized power lines are in ambient space in the vicinity of the aerial craft. In step 512, the electric and/or magnetic fields are measured with sensors 405, 410 located on the aerial craft. Ideally, the sensor 405, 410 on the aerial craft C should measure the electric E and magnetic H fields along three orthogonal directions (x, y, and z). To compute a 3-D Poynting vector P, it is necessary to measure a 3-D electric field and a 3-D magnetic field.

Measurements can be accomplished using either a single three-axis sensor or three single-axis sensors aligned orthogonally for one or both of sensors 405, 410. For example, sensor(s) 405 may be the E-field sensor disclosed in U.S. patent application Ser. No. 14/704,535 titled "ELECTRIC FIELD SENSOR" filed May 5, 2015, herein incorporated by reference in its entirety. Sensor 410 may be a magnetometer, for instance. An exemplary "H-cube" sensor 410 may be one which is a part of the Spar-300 system from Optical Ranging, Inc. (ORI) or other 3-axis magnetometer.

The electric field E measured with sensor(s) 405 along each of these orthogonal directions constitutes E-field sensor data 406 and may be denoted as $E_x$, $E_y$, and $E_z$. In SI units, electric field measurement data can be in volts per meter, for instance. The aerial vehicle should also measure the magnetic field along the same three orthogonal directions. Like before, a single three-axis sensor or three single-axis sensors can be used. The magnetic field H measured with sensor(s) 410 along each of these orthogonal directions constitutes H-field sensor data 411 and may be denoted as $H_x$, $H_y$, and $H_z$. In SI units, magnetic field measurement data can be in amps per meter, for instance.

The E and H values may be time harmonic, e.g., in the case of AC power. Thus, they may be characterized as complex number values, i.e., (a+ib), where a and b are real values, to indicate the magnitude and phase of each vector component in the rotating field.

As the aerial craft moves, at each step, the values of E and H can be measured from sensors 405, 410, respectively. The sensor data for E and H may be complex phasors for $E_x$, $E_y$, $E_z$, $H_x$, $H_y$, and $H_z$. A phasor is a 2-D vector (magnitude and phase) that represents the intensity and time-rotation of the field at a sensor location. They are essentially the same as the complex coefficients from the FFT mentioned in the detailed explanation earlier on.

There may be many field quantities being actively monitored during flight. First is the magnitude of E. Also, the second monitored, is the magnitude of H. The default threshold for E is 1000 V/m and for H is 0.1 A/m, for example. The third and fourth quantities are the percent change of these two magnitudes per unit distance traveled by the aerial craft. The default thresholds for these are 5%/m, for example. That is, if, in one meter of distance traveled by the aerial craft, these magnitudes change by more than 5%, the aerial craft "detects" the lines. The fifth and sixth quantities are the normalized spatial derivative of the two magnitudes from wingtip to wingtip. The default thresholds for these are 10%/m, for example. That is, if the magnitude varies by more than 10%/m from wingtip to wingtip, the aerial craft "detects" the lines. A seventh quantity may be the Poynting vector, and an eighth, its percentage change. If the Poynting vector is used, its threshold is 100 W/m$^2$ or 10% change, for example.

Accordingly, various quantities may be computed from the sensor data: the rms magnitude of the electric and magnetic fields; the change of these per unit of forward distance traveled by the vehicle; and the change of these from one side of the vehicle to the other. The first four values only require a single sensor on the craft, while the last two may require at least two sensors. This is because the aircraft is moving forward, and so fields can be sensed at different points along the flight path with a single sensor, whereas the spatial derivative perpendicular to the flight path requires two sensors (typically one on each wing). During the detection phase, as soon as one of these quantities exceeds a specific threshold, it detects the power lines.

Figure 6A:
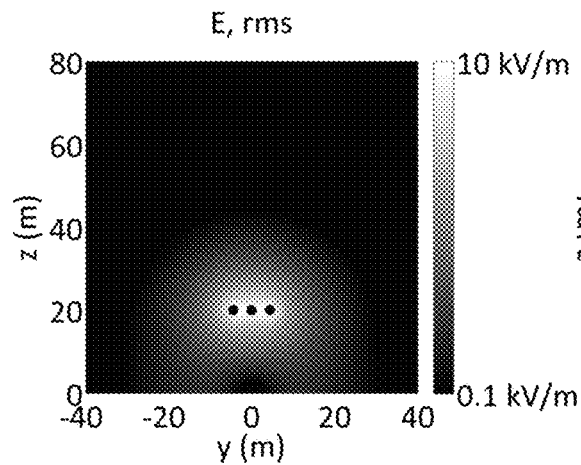
FIGS. 6(A)-6(D) and 7(A)-7(D) show the magnitudes and spatial derivatives of these magnitudes of the electric and magnetic fields around some example power lines in a plane perpendicular to the direction of the power lines which can be measured with sensors.
Figure 6B:
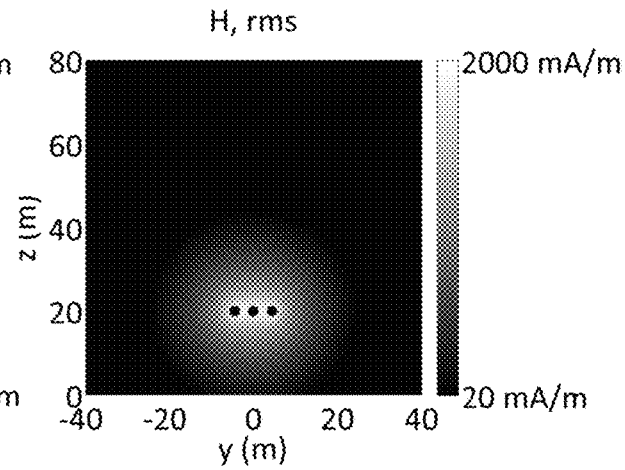
Figure 7A:
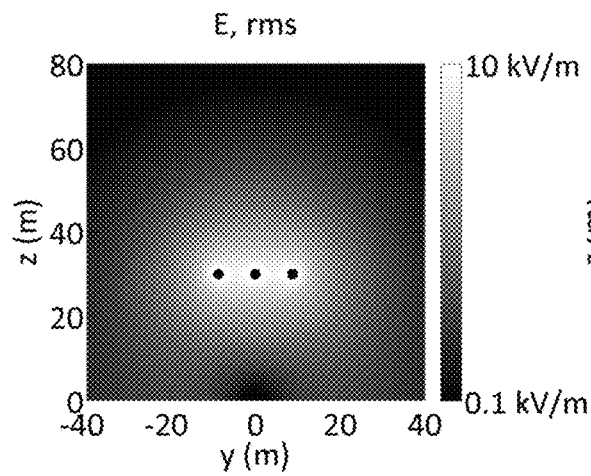
Figure 7B:
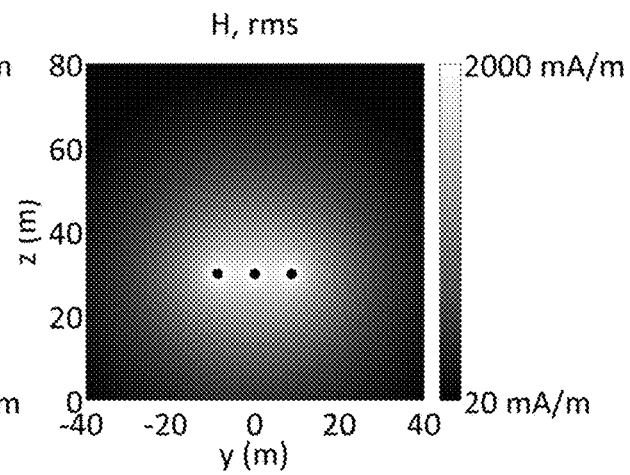

FIGS. 6(A)-6(D) and 7(A)-7(D) show the magnitudes and spatial derivatives of these magnitudes of the electric E and magnetic H fields around some example power lines in a plane perpendicular to the direction of the power lines which can be measured with sensors 405, 410. FIGS. 6(A) and 6(B) show the magnitudes of these fields for a 3-phase, 115-kV, 2-MW-class transmission line, where FIG. 6(A) shows the root-mean-square (rms) magnitude of the electric field, and FIG. 6(B) shows the rms magnitude of the magnetic field. FIGS. 7(A) and 7(B) show these fields for a 3-phase, 230-kV, 8-MW-class transmission line, where FIG. 7(A) shows the rms magnitude of the electric field and FIG. 7(B) shows the rms magnitude of the magnetic field. These fields form 'bulls-eye' patterns around the power lines. As should be apparent, the larger transmission line (230-kV, 8-MW-class) has much stronger fields at farther distances. Generally, a vehicle will measure larger and larger fields as it moves from a far distance closer to the lines.

One drawback with using rms magnitude values for these fields is that they depend on the voltages and currents on the lines. The electric field will be much stronger near the high-voltage transmission lines than near low-voltage distribution lines. Likewise, the magnetic field will be much stronger during peak energy usage in the afternoon on a hot day than at night, since the lines will be carrying more current at those times. Thus, in addition to using the rms magnitude of these fields, spatial derivatives can be used. For example, the derivative value dE/dy might be computed as a percent change per meter of travel in the y direction. It might also be normalized by dividing by magnitude of the E-field, i.e., dE/dy/E. The same can be done for the H-field derivative. These normalized values provide consistent detection thresholds vs. distance, regardless of the magnitudes of the voltage and/or current values of the power lines, as shown in FIGS. 6(A)-6(D) and 7(A)-7(D).

Figures 6C, 6D:
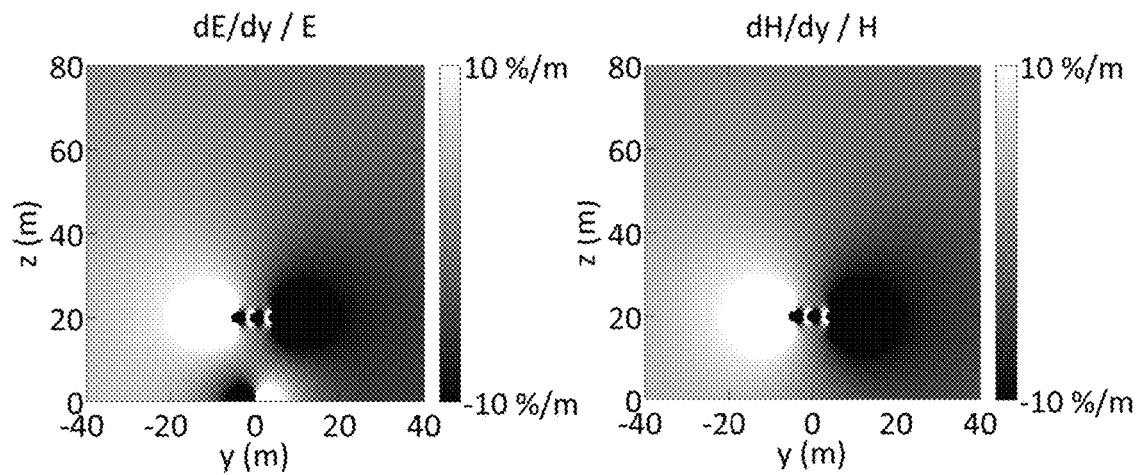
Figures 7C, 7D:
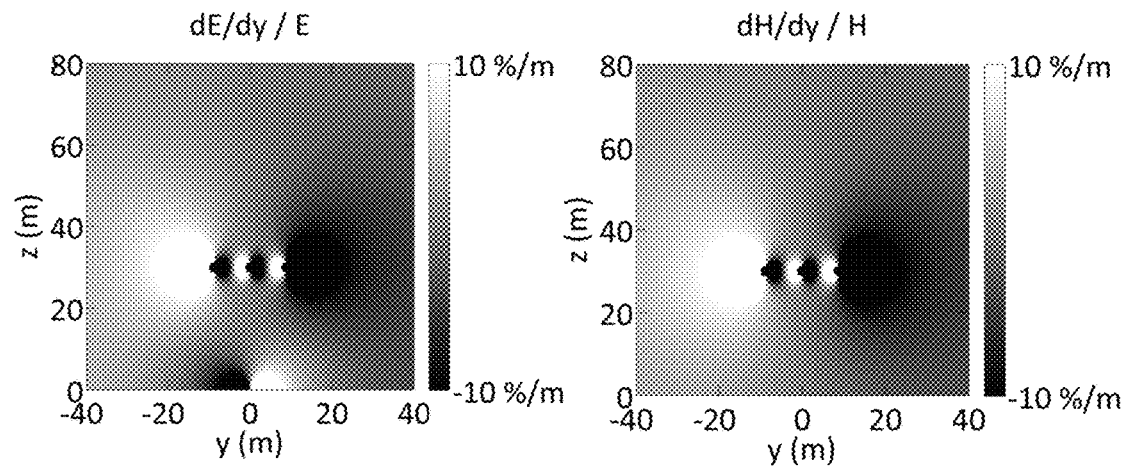

Some exemplary derivatives with respect to the horizontal direction of the rms magnitudes of the electric E and magnetic H fields of the same power lines are also shown. FIGS. 6(C) and 6(D) shows the spatial derivatives for a 3-phase, 115-kV, 2-MW-class transmission line, where FIG. 6(C) shows the derivative for the electric field and FIG. 6(D) shows the derivative for the magnetic field. FIGS. 7(C) and 7(D) shows the spatial derivatives for a 3-phase, 115-kV, 2-MW-class transmission line, where FIG. 7(C) shows the derivative for the electric field and FIG. 7(D) shows the derivative for the magnetic field. The values of these derivatives and how far they extend away from the power lines is roughly the same for both power lines. Time derivatives can be similarly calculated. For an aerial craft moving at a constant velocity, the time derivative and spatial derivatives will be proportional.

Retuning back to FIG. 5(A), in step 514, any energized power lines in the vicinity of the aerial craft are detected. There are various methods for detecting an energized power line in ambient space in the vicinity of the aerial craft using E and H fields, derivatives thereof, and/or related values thereof. E-fields are voltage dependent, whereas H-fields are current dependent. Typically, E-fields from distribution lines are on the order of 100 V/m at distances on the order of 10 m, and on the order of 1 V/m at distances on the order of 100 m. E-fields from transmission lines are typically ten times as large. Detecting the E-field at these levels is relatively easy in the sense that they do not have to be connected to an active load drawing current as for the H-field.

However, using the magnitude of the E-field or H-field alone for detection can result in false alarms. And this may lead to unnecessary avoidance maneuvers or one that begin too early. The E-field can be influenced by natural and man-made structures (such as trees and building) which tends to act as a ground. On the other hand, large metallic features (such as railroad track rails, bridges, scaffolds and towers, etc.) can influence H-fields. Thus, by further combining these two types of measurements together, for some applications, it is believed that false positives can be reduced or eliminated. Also, by employing both electric-field and magnetic-field sensors, the Poynting vector can distinguish between a "dead" line (no voltage, and thus no electric field) and an energized line that is not connected to any load (voltage, but no current, and thus no magnetic field).

Various combinations of the electric and magnetic fields, such as magnitudes, derivatives (spatial and time) with respect to time and/or distance, ratios, and changes, can be used to detect power lines. Magnitudes may be root mean square values, and changes can be in percentages, for instance. Each of these qualities has a specific detectable structure around the lines, which can be exploited to determine how close to the lines a vehicle may be.

In step 516, the orientation of the detect power lines is determined using the Poynting vector P. Again, the Poynting vector P is defined as the cross product of the electric and magnetic fields. In SI units, the Poynting vector P may be reported in units of watts per square meter (W·m$^{-2}$). Computation of this vector requires both the electric E and magnetic H fields. To compute a 3-D Poynting vector P, which is preferred, it is necessary to have a 3-D electric-field and a 3-D magnetic field measurement, i.e., $E_x$, $E_y$, $E_z$ and $H_x$, $H_y$, $H_z$.

From this measurement data, the magnitude of the electric field |E| and magnetic field |H| may be each calculated from the sensor data as follows:

$$|E|=\sqrt{|E_x|^2+|E_y|^2+|E_z|^2}$$

$$|H|=\sqrt{|H_x|^2+|H_y|^2+|H_z|^2}$$

The time-averaged Poynting vector, denoted as P, is thus calculated according to the following equation:

$$P=\tfrac{1}{2}*\mathrm{Real}(E \times H^*)$$

In this equation, the Real(E×H*) function extracts the real component of E×H*, where x is the cross product, and H* is the complex conjugate of the magnetic field H. The complex conjugate of the complex value negates the sign of the imaginary component of that complex value, i.e., (a+ib)*=a−ib, where a and b are real values.

The time-averaged Poynting vector P is parallel (or nearly parallel) to the power lines. For quasi-static power-line fields, the time-averaged Poynting vector P points in the direction of power flow (i.e., towards the load). Conversely, the negative value of the time-averaged Poynting vector P points in the direction away from the power flow (i.e., towards the power generating source).

When the aerial craft is moving, the controller can calculate P to determine the orientation of these power lines (i.e., which way the power lines are strung). In general, the averaging only needs to be computed once over one power cycle to ensure that the computed Poynting vector is in the direction of net power flow. For 60 Hz, it can be computed once every 1/60 sec. It is desirable to detect these power lines in sufficient time (and at sufficient distance) to allow the aerial craft to execute and effect wire-avoidance maneuvers.

FIG. 5(B) shows the processing for avoiding detected power lines or step 520 in FIG. 5. Once the aerial craft has detected the power lines, it should take action to avoid colliding or crashing into them. There are two primarily types of avoidance maneuvering schemes which may be utilized depending on whether the aerial craft is autonomously controlled or (human) piloted. An autonomous maneuvering avoidance scheme is on the left in the figure, and a piloted maneuvering avoidance scheme is on the right in the figure.

The autonomous maneuvering avoidance scheme includes step 522 in which an autonomous flight control maneuver is determined to avoid any detected power lines, and step 524 is which the aerial craft flight controller executes the control maneuver so that the craft avoids the power lines. The piloted maneuvering avoidance scheme includes step 526 in which the pilot is alerted to the presence of any detected power lines, and step 528 in which the pilot controls the aerial craft to avoid the power lines.

Some examples of craft maneuvering actions may include:
   a) turn one way and follow the lines downstream towards the load;
   b) turn the other way and follow the lines upstream away from the load, i.e., toward the power plant or generator;
   c) fly over (or, if sufficient room, under) the lines;
   d) fly over the lines and turn downstream;
   e) fly over the lines and turn upstream; or
   f) turn around and go back the way it came.

For actions a), b), d) and e), where the aerial craft turns and follows the lines either upstream or downstream, the aerial craft must know the orientation of the lines. The method can use time-averaged Poynting vector to determine this. Because the electric and magnetic fields are both perpendicular to the line, and because the Poynting vector is the cross product of the E and H fields, the time-averaged Poynting vector is parallel (or very close to parallel) to the lines. Thus, to turn downstream, the aerial craft turns so that is velocity vector become parallel to the time-averaged Poynting vector. To turn upstream, the aerial craft turns so that is velocity vector becomes anti-parallel to the time-averaged Poynting vector.

For actions c), d) and e), the aerial craft flies over the line by pulling up, and only when the quantities fall back under a predetermined threshold (which indicated that the aerial craft is flying away from the lines), the aerial raft levels off. For action d) and e), the aerial craft will turn downstream or upstream once it has leveled off. For action f), the aerial craft needs no other information about the power lines. It simply turns around and goes back the way it came.

These six actions take place during the avoidance and/or navigation process steps. All may have an avoidance phase: they turn downstream or upstream, pull up to avoid the lines, or turn around. Four actions have a navigation phase: These are a), b), d) and e). In these, the aerial craft uses the Poynting vector to determine the orientation of the lines, and then used this as a navigational aid to follow the lines. For actions c) and f), once the aerial craft has avoided the lines, it reverts back to the detection step in anticipation of encountering a new set of power lines.

FIG. 5(C) shows the processing for navigating detected power lines or step 530 in FIG. 5. This may be desirable for inspecting power lines. Power companies routinely inspect power lines, for instance, to assess damage after storms or other natural disasters.

According to one exemplary embodiment, one or more small- or micro-unmanned aerial crafts can be deployed to follow power lines from a known location (e.g., a substation) along the power lines until a break is detected. In this way, repair teams can be dispatched more efficiently, and less time will be needed to isolate individual faults. This invention could be used to assist SUAV navigation near power lines, and thus reduce the number of man-hours and large helicopter hours needed for inspection; this could significantly reduce the cost of inspections.

As discussed above, the Poynting vector points in the direction of energized power lines. Thus, the aerial craft can maneuver to fly parallel to the Poynting vector and thus the energized power lines. To align with the Poynting vector, if it is desired to follow the line "downstream" (i.e., toward the load), or anti-parallel to the Poynting vector, if it is desired to fly "upstream" (i.e., toward the power generating source). It could fly above (or below), or simply away from it.

When the aerial craft vehicle gets too close to the power lines, the vehicle should normally turn (yaw) until its heading vector, v, lines up with P. Since P points in the direction of power flow, by lining v up with P (i.e., the dot product of v and P will be positive), the vehicle will start traveling towards the load. On the other hand, by lining v up with negative P (i.e., the dot product of v and P will be negative), the vehicle will be traveling towards the power source. In practice, since the vehicle will be measuring E and H in its local coordinate system, and unless the vehicle has GPS, the vehicle will not know v. Therefore, to travel towards the load, the vehicle should turn so that P is pointing towards the front of the vehicle, and to travel towards the power source, the vehicle should turn so that P is pointing towards the back of the vehicle.

For example, to avoid the power lines, the aerial craft can generate maneuver control or commands (for control data 429) to turn the craft so that its velocity lines up with the Poynting vector P. This orients the aerial craft parallel to the power lines.

According to one non-limiting embodiment, to do this, the controller calculates the axis u around which the velocity vector v needs to be rotated to line up with P. The axis, u, can be calculated using:

$$u = v \times (\pm P)$$

It turns the aerial craft's heading to line up with the Poynting vector (or the negative of the Poynting vector) by rotating the velocity vector around some rotation axis (called u). This rotation axis is the cross product between the current velocity and the Poynting vector. The actual rotation can be performed using Rodrigues' formula below, which assumes the axis of rotation is normalized. That is the point of this normalization. At every time step, a new u vector is computed and used. The vector of axis u can be normalized as:

$$\hat{u} = \frac{u}{|u|}.$$

The ±P in the previous equation is positive if the default turning direction is chosen as downstream towards to the load and negative if the default turning direction is chosen as upstream towards the generator. Once u is calculated, v is rotated slowly towards P, using a known Rodrigues' formula, as follows:

$$v_{updated} = v \cos(\omega dt) \times (\hat{u} \times v) \sin(\omega dt) + \hat{u}(\hat{u} \cdot v)(1 - \cos(\omega dt))$$

The aforementioned maneuvering may not be possible for all aerial crafts. However, whatever navigation system is in use, the aerial craft should be able to initiate some sort of turning maneuver to line up the velocity vector with the ±P.

Once the vehicle has turned, the vehicle can continue to follow the power lines, either downstream (towards the load) or upstream (towards the power source) by continuing to turn so that it lines up with +P or −P, respectively.

The Poynting vector could also be used to estimate power flow in the lines. This could be used to help identify congestion and potential overload in power transmission or distribution networks that may not be sufficiently monitored with conventional technologies. As the aerial craft is flying along the power lines, an abrupt change in the Poynting vector would normally indicate the presence of a branch line. This could be used to enhance autonomous wire navigation, power-system mapping, etc.

In some embodiments, navigation can enable an autonomously-controlled vehicle to find a power source (e.g., a generator or substation), or alternately, an end user of electric power. This does not necessarily require any a priori knowledge of the layout of the power lines. This sensor capability could be used, for example, to help identify and map the state of a power grid during disaster recovery and/or nation-building campaigns. The electric field may be distorted by trees. Therefore, in some embodiments, perturbations in the electric field sensed as the craft is flying above the power lines could be used to identify the need for tree-trimming operations prior to any arc faults, fires, or power outages caused by overgrown trees.

Navigation may also be used as an aid in perching (or landing) operations for very small (unpiloted) aerial craft, such as drones or SUAVs. The flux density of the Poynting vector field increases as you move closer to a line. Therefore, the SUAV could move with (or against) the gradient of the Poynting vector if it was desired to move away from (or toward) the lines. Specifically this method could be used in perching operations, so that the SUAV could land on the power lines to recharge batteries, provide continuous surveillance, or simply if the SUAV needed to rest in a "safe" location (where it would not be easily picked up or run over). Similarly, the SUAV could move along a path of constant flux in the Poynting vector field in order to plot a course above (and along) the lines. This could be a useful first step before using the power lines as a navigational aid, and/or for mapping the lines.

The placement of the sensors 405, 410 on the aerial craft C is important. For instance, they should balance electrically (i.e., avionics signals); reduce or balance platform noise, balance weight, minimize their effect on the aerodynamics of the craft, etc. It is important that the electric- and magnetic-field sensors 405, 410 be oriented identically; for example, $E_x$ and $H_x$ should measure the electric and magnetic field along the same direction. Alternatively, the electric- and magnetic-field sensors can be oriented differently, but later "virtually" lined up e.g., using software, by rotating the measurements via a known 3-D geometric transformation. This alternative method requires knowing the relative orientation of the electric- and magnetic-field sensors a priori though. Ideally, the electric- and magnetic-field sensors should measure the electric and magnetic fields at the same point in space. Thus, the sensors should be placed as close together as possible. So long as the distance between sensors is relatively small compared to the vehicle-to-line distance, the resulting errors should be relativity small.

Figure 8A:
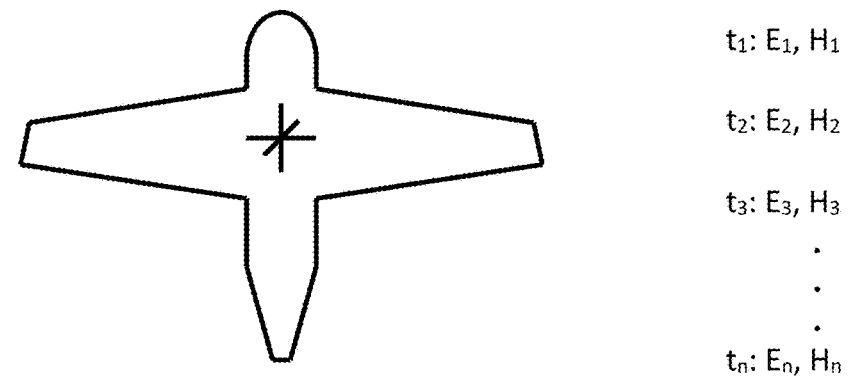
FIGS. 8(A)-8(D) show exemplary sensor placement configurations on an aerial craft and sensor data calculations according to embodiments.
Figure 8A:
Figure 8B:
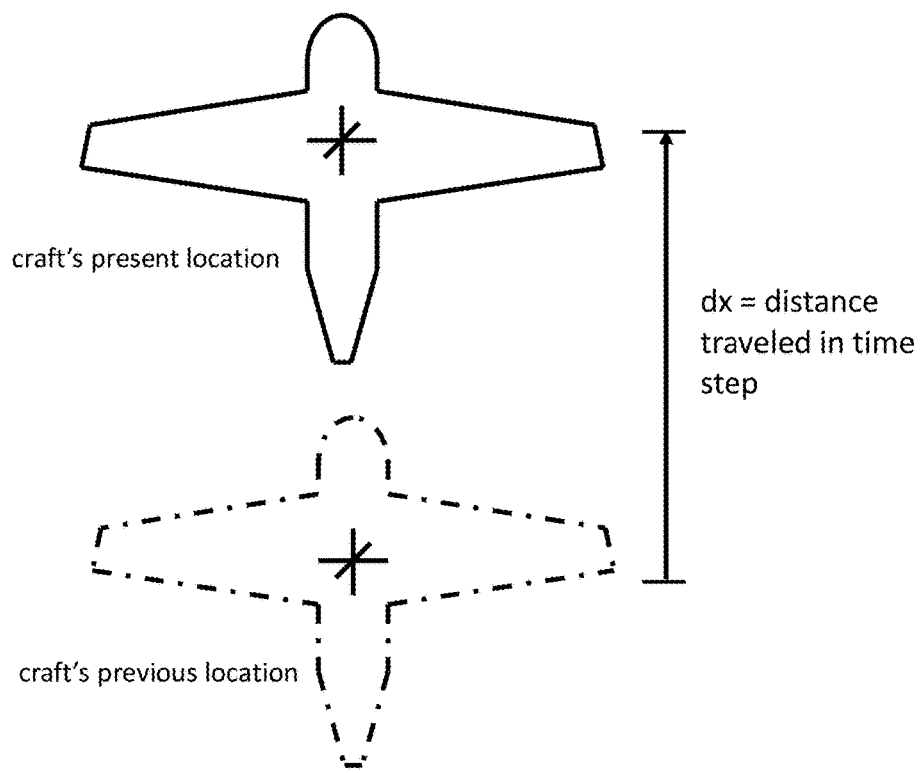

FIGS. 8(A)-8(D) show exemplary sensor placement configurations on an aerial craft and sensor data calculations according to embodiments. A "birds-eye" top view outline of an aerial craft is illustrated in each of these figures. The embodiments shown in FIGS. 8(A) and 8(B) illustrate a single sensor pair having a 3-axis E-field sensor and a 3-axis H-field sensor which are both positioned at the same location on the aerial craft. This location may correspond with the center of mass of the aerial craft, for example. FIG. 8(A) shows the single sensor pair used for measuring E and H. At each time-step, $t_1, t_2, t_3 \ldots t_n$, sensors 405, 410 generate sensor data 406, 411 for the E-field and H-field measurements, respectively. The raw sensor data $E_1, E_2, E_3 \ldots E_n$ and $H_1, H_2, H_3 \ldots H_n$ is fed into and processed by the controller 420. From this data, |E| and |H| can be calculated for each time step.

FIG. 8(B) shows how this same single sensor pair can be used for calculating spatial derivative values of E and H in the x-direction. The variable dx is distance that the aerial craft travels in a time-step, t. (If the aerial craft is assumed to be traveling along a straight trajectory in the x-direction at a constant velocity v, then dx may be assumed to be a constant value, i.e., the product of velocity and the time step v* t. Of course, one skilled in the art should be able measure more complex flight dynamics with vectored velocity data and timing circuits, for instance). The spatial derivatives of E and H in the x-direction, d|E|/dx and d|H|/dx then may be calculated from taking the difference of the |E| and |H| values at adjacent time steps—i.e., present (subscript pres) and previous (subscript prev)—divided by dx. It has been found that normalizing the spatial derivatives provide a better, more relatable measurement for power-line detection purposes. As such, the spatial derivatives may be further divided by their magnitude and the present time step. Multiplying by 100 reports this data as a percent change (in SI units, %/m).

Accordingly, the normalized spatial derivative of E in the x-direction (d|E|/dx)/|E| may be reported as a relative change (in %/m) and be calculated as:

$$(d|E|/dx)/|E| = ((|E|_{pres} - |E|_{prev})/dx)/|E|_{prev} * 100$$

Similarly, the normalized spatial derivative of H in the x-direction, (d|H|/dx)/|H| may be reported as a relative change (in %/m) and be calculated as:

$$(d|H|/dx)/|H| = ((|H|_{pres} - |H|_{prev})/dx)/|H|_{prev} * 100$$

Figure 8C:
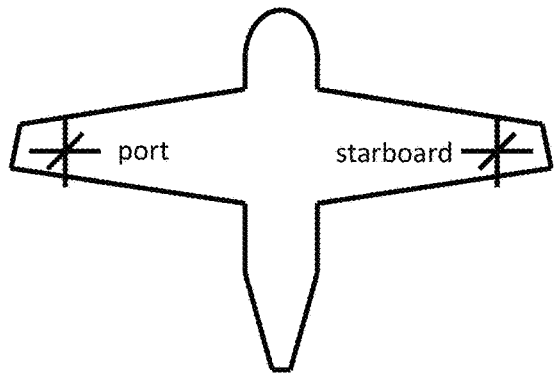
Figure 8D:
Figure 8D:
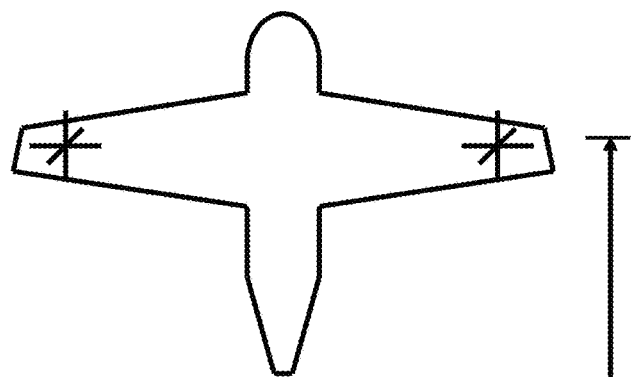
Figure 8D:
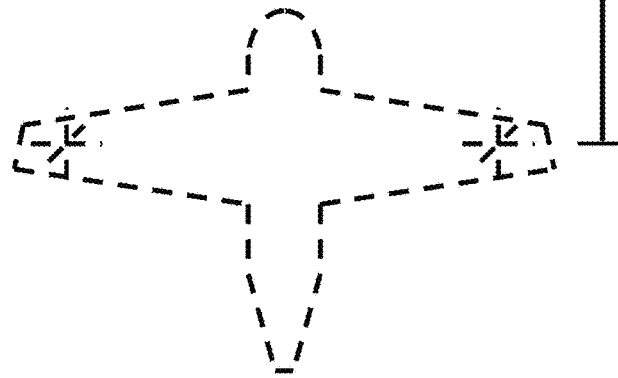

The embodiments shown in FIGS. 8(C) and 8(D) illustrate a configuration with two sensor pairs. Each sensor pair includes a 3-axis E-field sensor and a 3-axis H-field sensor positioned together. As illustrated, a sensor pair is placed on both wings of the aerial craft. One sensor pair thus corresponds to the port (left) side and the other sensor pair correspond to the starboard (right) side. The sensor pairs here are spaced apart a distance dy, which, as shown here, may correspond the wingspan of the aerial craft.

FIG. 8(C) shows the two sensor pairs can be used for measuring E and H. At each time-step, $t_1, t_2, t_3 \ldots t_n$, sensors 405, 410 generate sensor data 406, 411 for the E-field and H-field measurements, respectively, at the port and starboard locations. The raw sensor data, $E_{port\_1}, E_{star\_1}, E_{port\_2}, E_{star\_2}, E_{port\_3}, E_{star\_3} \ldots E_{port\_n}, E_{star\_n}$, and $H_{port\_1}, H_{star\_1}, H_{port\_2}, H_{star\_2}, H_{port\_3}, H_{star\_3} \ldots H_{port\_n}, H_{star\_n}$ is fed into and processed by the processor 420. From this data $|E|_{port}, |E|_{star}$ and $|H|_{port}, |H|_{star}$ can be calculated for each time step.

FIG. 8(D) shows how the two sensor pairs can be used for calculating spatial derivative values of E and H in both the x- and y-directions. The spatial derivatives of |E| and |H| in the x-direction, (d|E|/dx) and (d|H|/dx), can be calculated for both the port and starboard locations from the respective sensor data, in a similar manner as discussed above for the single sensor pair. Accordingly, the normalized spatial derivatives of E and H in the x-direction at the port location may be reported as a relative change (in %/m) and be calculated as:

$$(d|E|_{port}/dx)/|E|_{port} = ((|E|_{port,pres} - |E|_{port,prev})/dx)/|E|_{port,prev} * 100$$

$$(d|H|_{port}/dx)/|H|_{port} = ((|H|_{port,pres} - |H|_{port,prev})/dx)/|H|_{port,prev} * 100$$

The normalized spatial derivatives of E and H in the x-direction at the starboard location may be similarly calculated using the starboard sensor location data.

The spatial derivatives of |E| and |H| in the y-direction, (d|p/dy) and (d|H|/dy), can be calculated for using correspond data from both the port and starboard locations at the same time step. Accordingly, the normalized spatial derivatives of E and H in the y-direction (d|E|/dy)/|E| and (d|H|/dy)/|H| may be reported as a relatively change (in %/m) and be calculated as:

$$(d|E|dy)/|E| = ((|E|_{port} - |E|_{starboard})dy)/|E|_{port} * 100$$

$$(d|H|dy)/|H| = ((|H|_{port} - |H|_{starboard})dy)/|H|_{port} * 100$$

If a third pair of sensors is provided, for example, corresponding to the altitude direction, z, than spatial derivative in the z-direction could similarly be calculated.

FIGS. 9(A)-9(E) show simulated autonomous power line detection, avoidance and navigation maneuvering of an exemplary aerial craft in accordance with embodiments of the invention. The aerial craft may be assumed to be unmanned. These simulations were made using a software application called "ARL Wire-Avoidance Simulation Program" or ARL-WASP which was developed by the U.S. Army Research Laboratory (ARL). It further makes use of the software application called "ARL Power-Line UAV Modeling and Simulation" or ARL-PLUMS, also developed by ARL. Presently, distribution of ARL-WASP and ARL-PLUMS are limited to only U.S. Government and Government Contractors.

ARL-WASP allows users to model an aerial craft (such as a SUAV) flying around power lines and provides a text bench for rapidly testing new maneuver method. It was developed in MATLAB (MathWorks). ARL-WASP depicts a 3-D virtual world showing an aerial craft and energized power lines. In using the ARL-WASP application, the uses enter the following information and parameters, including:

a) Model File: a power-line model needs to be loaded. Various 3-phase power-line configurations can be modeled in this manner. In FIGS. 9(A)-(E), a single 3-phase energized power line is oriented in a generally horizontal configuration, with phase A closest to the aircraft, and phase C farthest from the aircraft.

b) $x_0, y_0$, and $z_0$: the starting position of the aerial craft. The typical global coordinate system used in this simulation (and in FIG. 3) is as follows: +x is parallel to the power lines, and pointing in the direction of net power flow; +y is perpendicular to the lines and "horizontal" (pointing "left" when looking "downstream", in the direction of net power flow); +z is vertical ("up").

c) $v_x, v_y$, and $v_z$: the starting velocity of the aerial craft.

d) ω: the maximum angular rate (e.g., in degrees per second) at which the aerial craft is capable of turning.

e) Default turning direction: the desired direction the aerial craft should turn (e.g., either "downstream" towards the load or "upstream" towards the power generator).

f) Threshold: the magnitude of the E-Field under which the aerial craft should begin turning.

In the sequence of ARL-WASP simulations in FIGS. 9(A)-9(E), there are three panes 910, 920 and 930 of a graphical user interface shown. Pane 910 depicts the location of the energized power lines and aerial craft in space. The 3-D space is depicted in a coordinate system shown with the three orthogonal axes, x, y and z. The power lines' locations are retrieved from the model file. Voltages and currents values are also retrieved from the model file. The simulation generates E and H fields about the power lines from the voltage and current values in a manner to simulate their presence in the real world. E- and H-sensors (corresponding to sensors 405, 410) are assumed on the aerial craft which can detected these simulates fields. When the simulation is running, it will show the path of the aerial craft as well.

Pane 920 illustrate the detected simulated data. In these simulations, the aerial craft is monitoring six field quantities: the magnitude of the electric- and magnetic fields (top); the normalized spatial derivative in the direction of flight (middle); and the normalized spatial derivative from wingtip to wingtip (bottom). Pane 930 illustrates the current heading vector v of the aerial craft and the Poynting vector P, which is updated based on the sensed E- and H-fields. This pane shows normalized versions of v and P. These vectors will be continuously updated as the simulation runs. The simulated algorithm (corresponding to processes executed by controller 420) uses these quantities to detect, avoid, and navigate around/about the power lines, as discussed below.

Figure 9A:
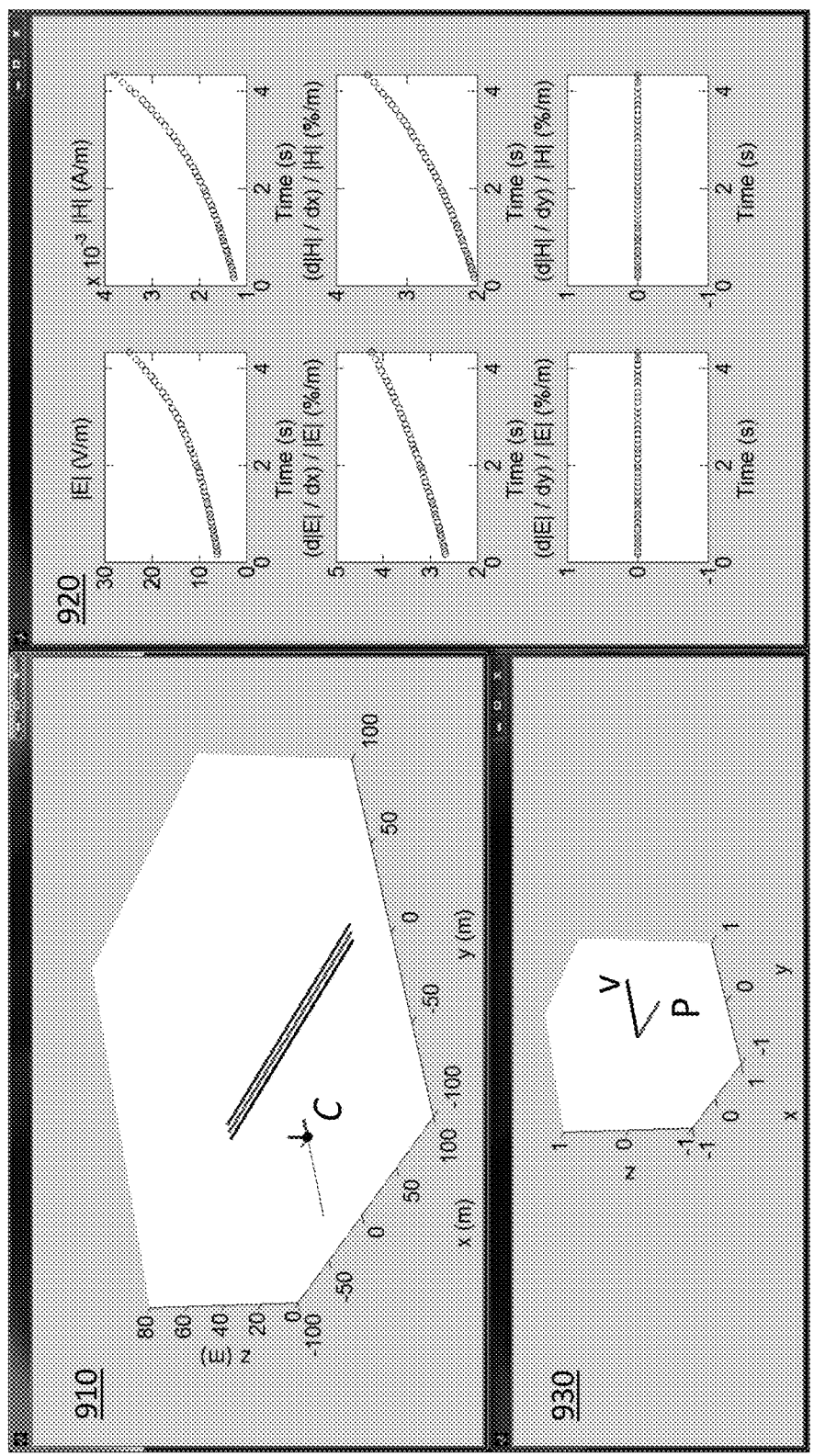
FIGS. 9(A)-9(E) show simulated autonomous power line detection, avoidance and navigation maneuvering of an exemplary aerial craft in accordance with embodiments of the invention.

In FIG. 9(A), the aerial craft is shown flying towards the power lines in pane 910. Thus, the heading of the aerial craft, marked by the vector v in pane 930 points in a direction towards the power lines. The six field quantities are tracked in pane 920. The time-averaged Poynting vector P points in pane 930 in a direction parallel the power lines.

Figure 9B:
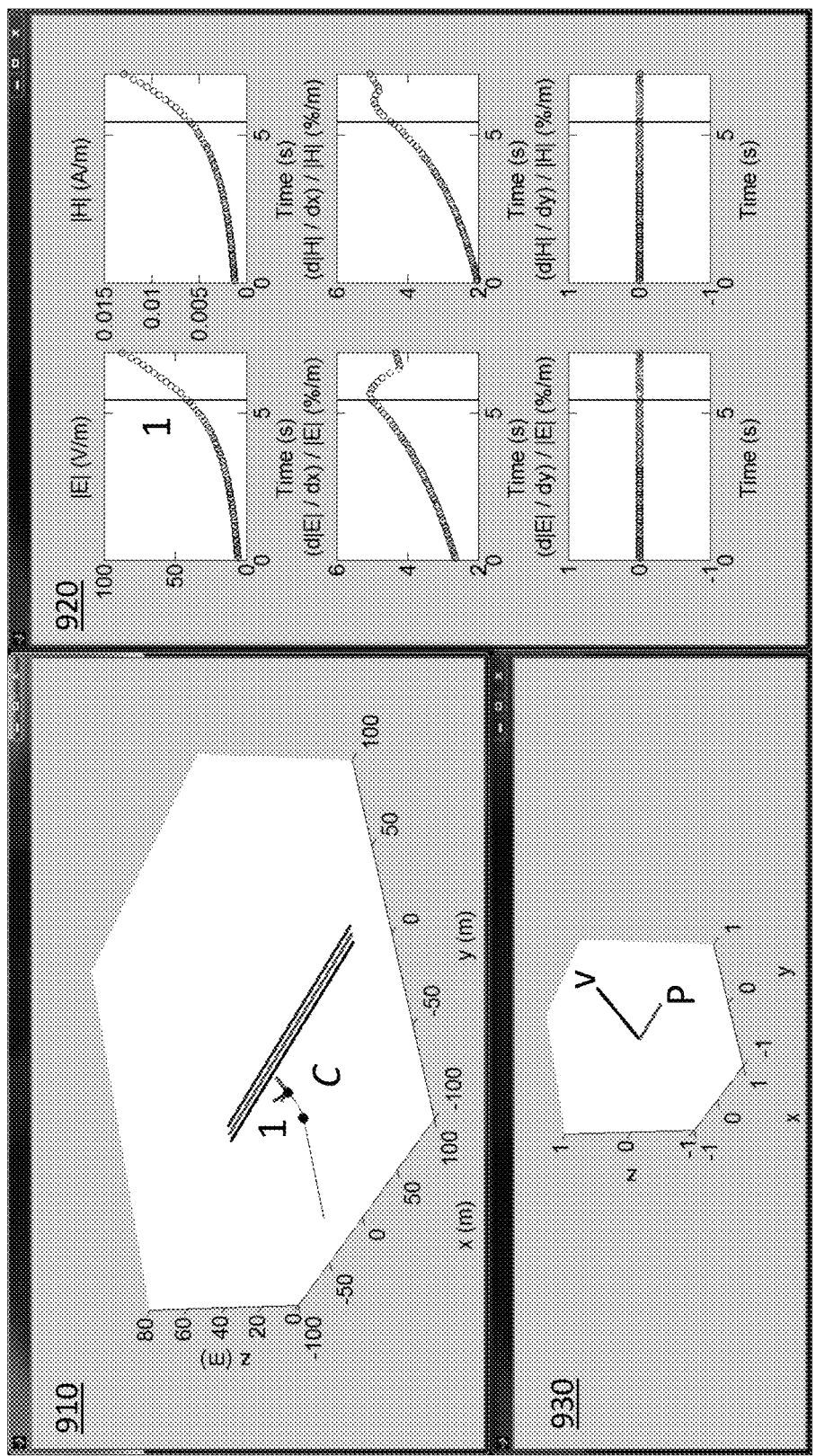
Figure 9C:
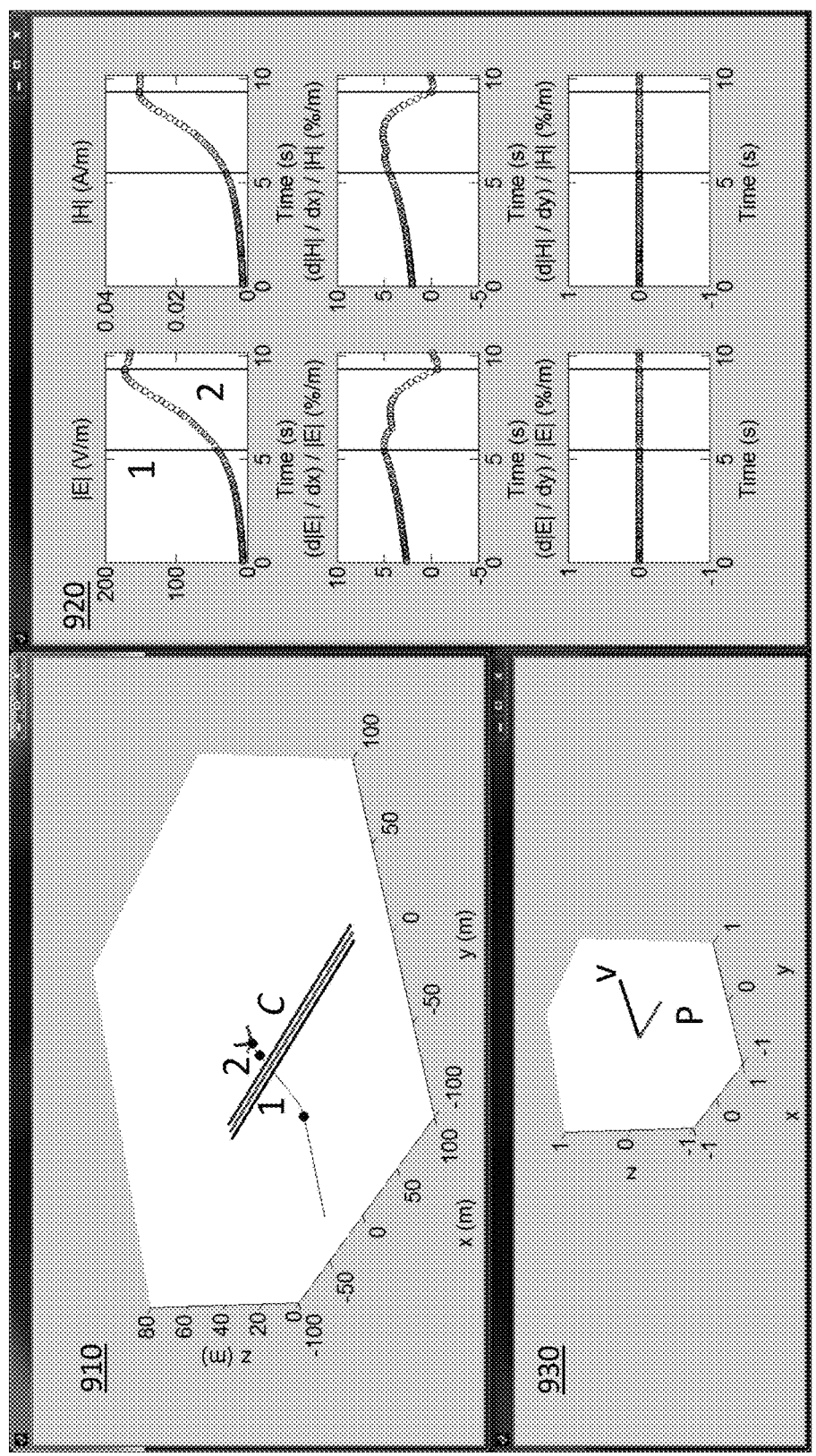

Turning to FIG. 9(B), the normalized spatial derivative of the electric field in the direction of flight has crossed the specified threshold of 5%/m, so the aerial craft has initiated a pull up maneuver (marked by a 1 in the plots) to avoid the power lines. The heading v of the aerial craft in pane 930 has pulled up. Once the aerial craft begins passing over the power lines, as shown in FIG. 9(C), the normalized spatial derivative of the electric field falls below 0%/m and become negative, indicating that the aerial craft is moving away from the power lines. As a result, the aerial craft has begun leveling off (this maneuver is marked by a 2 in the plots). The heading v of the aerial craft has started to fall back down.

Figure 9D:
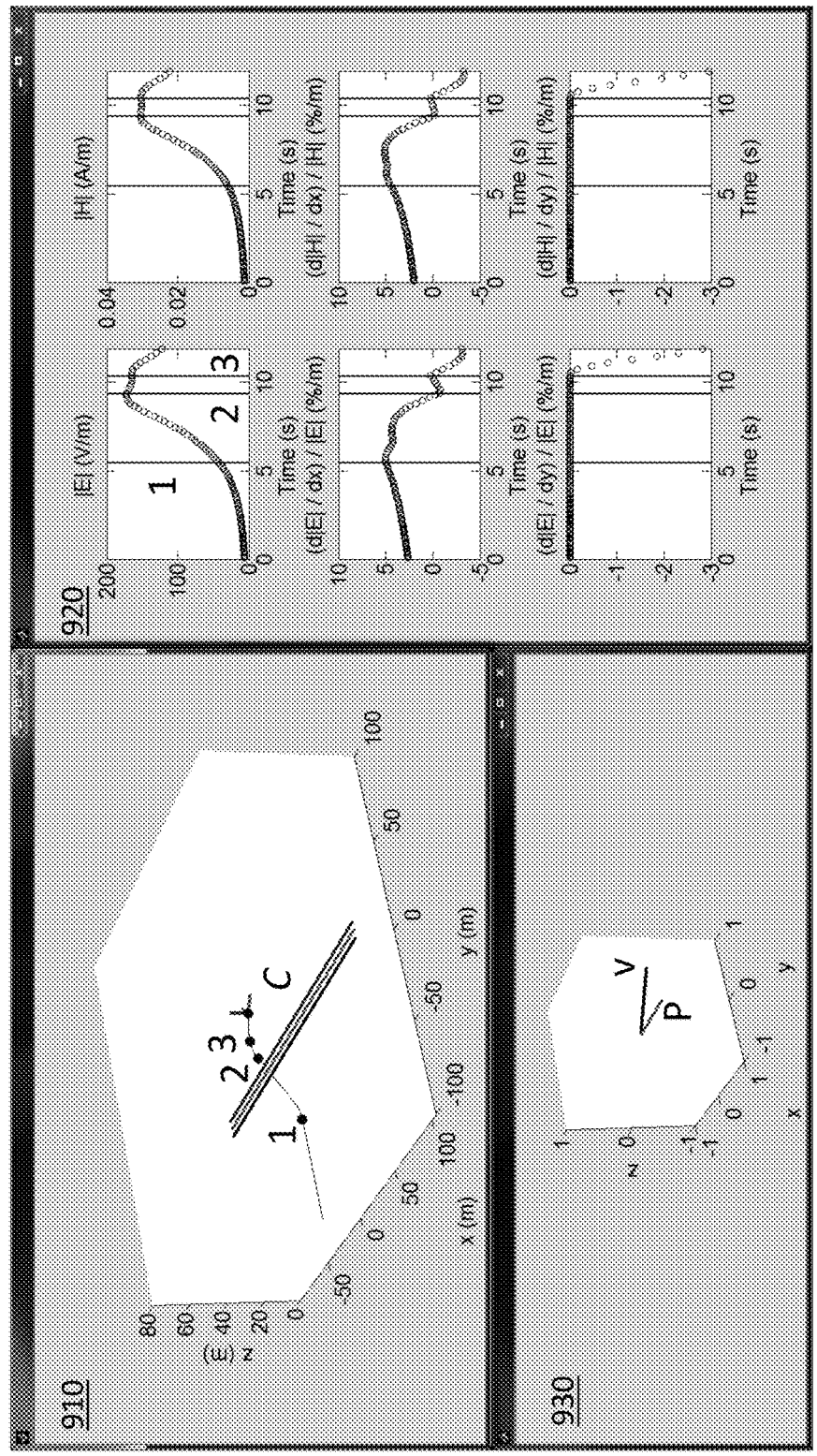
Figure 9E:
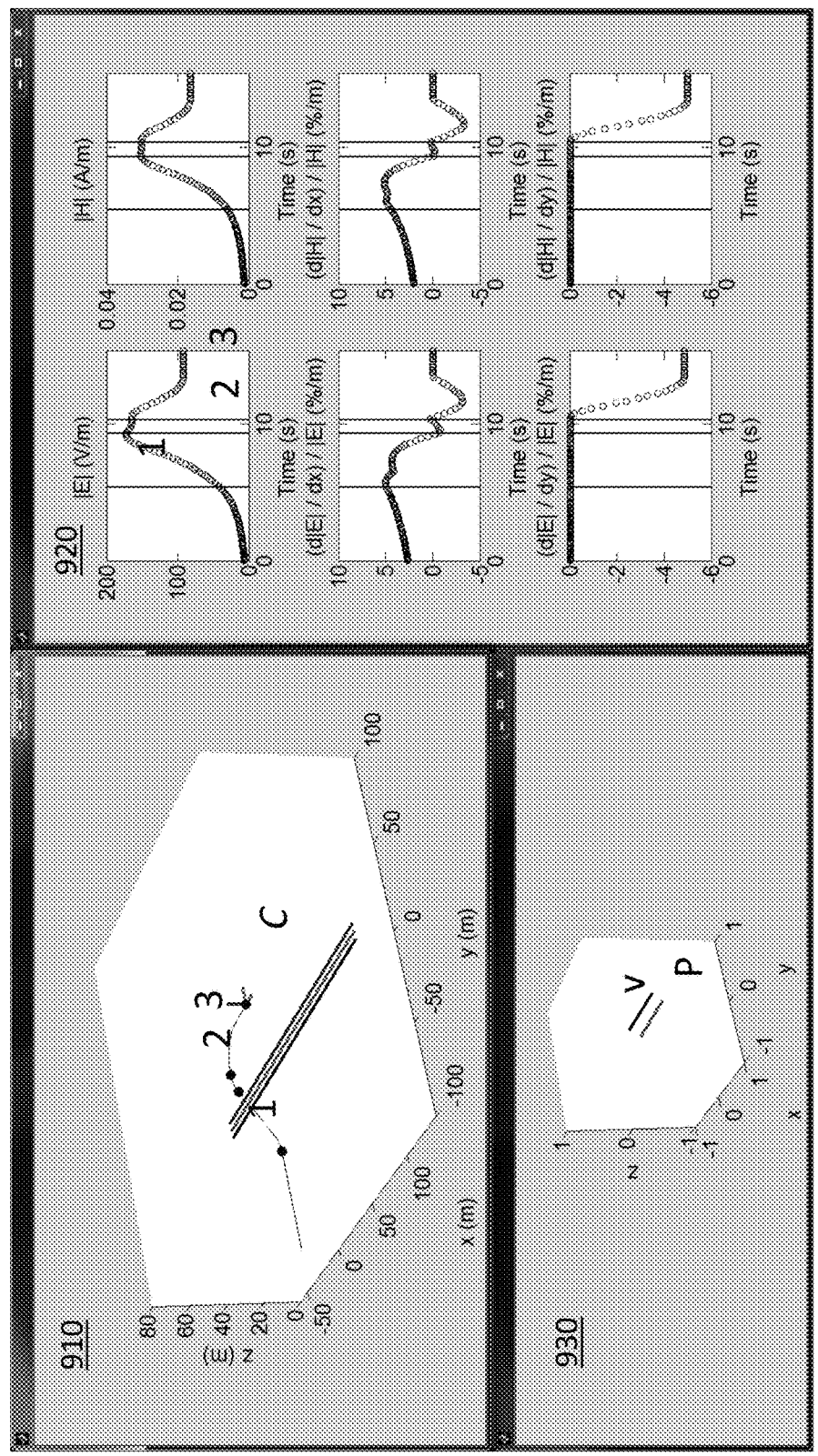

In FIG. 9(D), the aerial craft begins a navigation maneuver. Here, the aerial craft has been programmed to follow the power lines downstream after avoiding them. Because the default turning direction was chosen as "downstream," the aerial craft is turning to the right, so that its heading will line up with the Poynting vector. The aerial craft has therefore initiated a turn to the right (this maneuver is marked by a 3 in the plots). The heading v of the aerial craft is turning to line up with the time-averaged Poynting vector P. Turning to FIG. 9(E), it can be appreciated that the aerial craft has completed the turn. The heading v of the aerial craft and the time-averaged Poynting vector P are now lined up. At this point, the aerial craft will continue to follow the lines downstream.

FIG. 10 shows an exemplary cockpit 1000 of a piloted aerial craft having an instrument panel according to an embodiment. The cockpit 1000 includes instrument panel 1040. The window 1010 is also depicted which allows the pilot to look outside and help maneuver the vehicle. As previously mentioned, due to poor lighting conditions, weather, etc., the pilot may not been able to "see" power lines PL in the vicinity of the vehicle which present a collision hazard.

Thus, the instrument panel 1040 is configured to alert the pilot to the presence of any power lines PL detected by the power line detection controller 420 (FIG. 4). The instrument panel 1040 includes all the necessary controls, electronic (avionics), gauges, and other means for the pilot to control the craft, which will vary from vehicle to vehicle. Collectively these are shown as 1041. Common instruments and gauges, which are found in most aerial crafts, include an altimeter, airspeed indicator, vertical speed indicator, compass, heading indicator, turn indicator, for example. Additionally, is may be common for the panel to include a fuel gauge, radio or other communication means, steering and landing controls, lighting controls, temperature indicators, to name a few.

In accordance, with embodiment of the present invention, the instrument panel 1040 may include audio means, visual means or both for alerting the pilot to detected power lines. For instance, a speaker or siren 1043 may be activated by control data to produce sounds; thus could be a simple alert message, such as "Power lines have been detected in the vicinity. Fly with caution." or a beep or specific sound which the pilot associated with the same. Further information might also be provided to the pilot, such as the distance and/or location to the detect power lines from the craft's current position. One message might be "Power lines have been detected approximately 1500 m ahead on the current flight path. Fly with caution."

Alternatively or additionally, the instrument panel 1040 may include visual means for doing the same. This could include an alert warning lamp/light or other indicia being activated. A light/lamp light could be turned cony or blinked or flashed 'on'/'off' to get the pilot's attention and alert him or her to the hazard. The intensity of the light or sound could relate to distance to the power line or magnitude and/or phase of detected power. Moreover, in additional to alerting the pilot to the presence of any detected power lines, the instrument panel 440 may be configured to display the location and/or orientation of the power lines to the pilot. This could be on a "head's-up-display" 1042 or perhaps another designated display which display a visual alert 1044. The alert warning 1044 could flash to further capture the pilot's attention.

Additional embodiments of this invention are possible if inertial measurement unit/inertial navigation unit (IMU/INU) data, windspeed, the vertical (gravity) vector, elevation and/or altitude information are known. Additionally, the position of the vehicle may be known (if Global Positioning System (GPS) is accessible), and the approximate positions of power lines may be known (if the vehicle has access to map data). It is assumed that an autopilot can be programmed to take advantage of any or all of this additional information by one of ordinary skill and knowledge of flight dynamics.

As discussed above, embodiments of the present invention have vast applicability to many different types of aerial craft, such as unmanned and autonomous air vehicles, and more particularly quad-copters and other Small Unmanned Aerial Vehicles (SUAVs) close to the earth, where they could accidentally fly into power lines. Power lines are among the most difficult objects to detect, and among the most dangerous obstacles that an aerial craft must avoid.

In addition, embodiments of the present invention may be incorporated into various types of devices other than aerial crafts. For instance, vehicle-mounted 'whip-antennas' can collide with low-hung power lines and cause power to arc through the vehicle which can be dangerous for the passengers. Similarly, long backpack mounted antennas pose problems for personnel as they too can provide an arcing and electrocution hazard. Booms or extendable metal objects (such as ladders) likewise pose these problems. Thus, users of these devices may be benefited by embodiments of the present invention which detect energized power lines in ambient space.

According, to another such embodiment, a hand-held, portable device can be used to identify the direction of current flow in power cables in ad hoc situations. This embodiment could also be useful for mapping electric circuits behind walls, for example. Other embodiments of the invention may include a device incorporated into a helmet or vehicle, for example, to warn an operator that he is approaching an overhead power line; it might further provide navigational information if he wants to turn toward the generator or load. These are only a few of the possible applications of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for detecting energized power lines in ambient space in the vicinity of an aerial craft, the method comprising:
   measuring, with sensors located on the aerial craft, electric and magnetic fields in said space; and
   with a power line detection controller,
      detecting an energized power line in said space in the vicinity of the aerial craft using the sensor data;
      determining the direction of power flow through the energized power line using a Poynting vector, wherein the Poynting vector points parallel to the energized power line; and
      associating, as a directional reference, the Poynting vector for the orientation of the detected energized power line in said space.

2. The method of claim 1, wherein detecting an energized power line in said space in the vicinity of the aerial craft using the sensor data comprising:
   (a) using a derivative of the electric field measurement;
   (b) using a derivative of the magnetic field measurement; and/or
   (c) using normalized values of the electric field measurement and/or the magnetic field measurement.

3. The method of claim 2, wherein detecting an energized power line in said space in the vicinity of the aerial craft using the sensor data comprises:
   (d) using derivatives of both the electric and magnetic field measurements; and/or
   (e) using normalized derivatives of both the electric and/or magnetic field measurements.

4. The method of claim 1, wherein detecting an energized power line in said space in the vicinity of the aerial craft using the sensor data comprises:
   (f) using a Poynting vector;
   (g) using a derivative of the Poynting vector; and/or
   (h) using a normalized derivative of the Poynting vector.

5. The method of claim 1, wherein detecting an energized power line in said space in the vicinity of the aerial craft using the sensor data further comprises: identifying any power lines in said space based on a determination that the electric field measurement, the magnetic field measurement, a derivative of the electric field measurement, a derivative of the magnetic field measurement, a normalized derivative of the electric field measurement, a normalized derivative of the magnetic field measurement, a Poynting vector, a derivative of the Poynting vector, and/or a normalized derivative of the Poynting vector is/are greater than a corresponding predetermined threshold value for that value.

6. The method of claim 1, further comprises: calculating the Poynting vector using the measured electric and magnetic fields.

7. The method of claim 6, wherein the Poynting vector is calculated every power cycle of the electricity expected to be carried by the power line.

8. The method of claim 1, further comprising: tracking, in said space, the locations of the aerial craft and the associated directional reference for any detected energized power line.

9. The method of claim 1, further comprising: alerting a human pilot to the presence of any detected energized power line in the vicinity of the aerial craft.

10. The method of claim 1, further comprising: automatically controlling the aerial craft to avoid colliding with the energized power line taking into account the associated directional reference for the power line.

11. The method of claim 1, further comprising: controlling the aerial craft to follow along in a direction substantially parallel to the associated directional reference for the detected energized power line.

12. The method of claim 1, wherein detecting an energized power line in said space in the vicinity of the aerial craft using the sensor data comprises:
   using a derivative of the Poynting vector.

13. A system for detecting energized power lines in ambient space in the vicinity of an aerial craft, the system comprising:
   electric field and magnetic field sensors located on the aerial craft configured to measure the electric and magnetic fields in said space; and
   a power line detection controller configured to:
      detect an energized power line in said space in the vicinity of the aerial craft using the sensor data;
      determine the direction of power flow through the energized power line using a Poynting vector, wherein the Poynting vector points parallel to the energized power line; and
      associate, as a directional reference, the Poynting vector for the orientation of the detected energized power line in said space.

14. The system of claim 13, wherein the electric field sensor and magnetic field sensor each comprise a single three-axis sensor or three single-axis sensors aligned orthogonally.

15. The system of claim 13, wherein the electric field sensor and magnetic field sensor are located at the same position on the aerial craft.

16. The system of claim 13, wherein there is a pair of electric field and magnetic field sensors, and the controller is further configured to take derivative measurements from said sensors.

17. The system of claim 13, further comprising: an instrument panel having audio means, visual means, or both, for alerting a pilot to a detected energized power line; and means for displaying the location and/or orientation of the power lines to the pilot.

18. The system of claim 13, further comprising a dynamic flight controller, wherein the power line detection controller is further configured to determining maneuvers for the aerial craft to avoid the detected energized power lines which are provided to the dynamic flight controller taking into account the associated directional reference for the power line.

19. The system of claim 18, wherein the power line detection controller is further configured to determine maneuvers for the aerial craft to inspect the detected energized power lines taking into account the associated directional reference for the power line.

20. The system of claim 13, wherein the power line detection controller is located on the aerial craft.

21. An aerial craft configured to detect energized power lines in ambient space comprising:
   electric field and magnetic field sensors configured to measure the electric and magnetic fields in said space in the vicinity of the aerial craft; and
   a power line detection controller configured to:
      detect an energized power line in said space in the vicinity of the aerial craft using the sensor data;
      determine the direction of power flow through the energized power line using a Poynting vector, wherein the Poynting vector points parallel to the energized power line; and
      associate, as a directional reference, the Poynting vector for the orientation of the detected energized power line in said space.

22. A device configured to detect energized power lines comprising:
   electric field and magnetic field sensors configured to measure the electric and magnetic fields in said space; and
   a controller configured to: detect an energized power line in said space using the sensor data,
   wherein, in detecting an energized power line in said space in the vicinity of device using the sensor data, the controller is configured to:
      (a) use a derivative of the electric field measurement;
      (b) use a derivative of the magnetic field measurement;
      (c) use a normalized derivative of the electric field measurement;
      (d) use a normalized derivative of the magnetic field measurement;
      (e) use a derivative of the Poynting vector; and/or
      (f) use a normalized derivative of the Poynting vector.

23. The device of claim 22, wherein the device is handheld or incorporated into a helmet or vehicle.

* * * * *